United States Patent
Lin et al.

(10) Patent No.: US 12,147,014 B2
(45) Date of Patent: Nov. 19, 2024

(54) OPTICAL IMAGING LENS

(71) Applicant: Genius Electronic Optical (Xiamen) Co., Ltd., Xiamen (CN)

(72) Inventors: Maozong Lin, Xiamen (CN); Citian You, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 868 days.

(21) Appl. No.: 17/179,879

(22) Filed: Feb. 19, 2021

(65) Prior Publication Data

US 2022/0179175 A1 Jun. 9, 2022

(30) Foreign Application Priority Data

Dec. 9, 2020 (CN) .......................... 202011425841.9

(51) Int. Cl.
*G02B 13/00* (2006.01)
*G02B 9/62* (2006.01)

(52) U.S. Cl.
CPC ........... *G02B 13/0045* (2013.01); *G02B 9/62* (2013.01)

(58) Field of Classification Search
CPC . G02B 9/62; G02B 9/64; G02B 13/18; G02B 13/0045; G02B 13/002
USPC ................. 359/757, 681, 692, 750, 754, 755
See application file for complete search history.

(56) References Cited

U.S. PATENT DOCUMENTS

2021/0302698 A1* 9/2021 Nitta ................... G02B 13/0045
2022/0308317 A1* 9/2022 Wang ....................... G02B 9/64

FOREIGN PATENT DOCUMENTS

WO    WO-2021114233 A1 *  6/2021

* cited by examiner

*Primary Examiner* — Travis S Fissel
(74) *Attorney, Agent, or Firm* — Chen Yoshimura LLP

(57) ABSTRACT

The present invention provides an optical imaging lens. The optical imaging lens comprises eight lens elements positioned in an order from an object side to an image side. Through controlling the convex or concave shape of the surfaces of the lens elements, the optical imaging lens may be provided with shortened system length, reduced f number, and increased image height, along with good imaging quality.

18 Claims, 40 Drawing Sheets

| Embodiment 1 ||||||||
|---|---|---|---|---|---|---|---|
| EFL = 5.136 mm ; HFOV = 39.964 degrees ; TTL = 6.917 mm ||||||||
| Fno = 1.649 ; Image Height = 5.800 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.422 | | | | |
| L1A1 | 1st lens element | 2.846 | 0.537 | 1.545 | 55.987 | 8.247 | Plastic |
| L1A2 | | 7.216 | 0.040 | | | | |
| L2A1 | 2nd lens element | 7.974 | 0.220 | 1.671 | 19.243 | -15.094 | Plastic |
| L2A2 | | 4.431 | 0.227 | | | | |
| L3A1 | 3rd lens element | 4.344 | 0.526 | 1.545 | 55.987 | 9.832 | Plastic |
| L3A2 | | 21.735 | 0.803 | | | | |
| L4A1 | 4th lens element | -40.648 | 0.246 | 1.671 | 19.243 | 36.510 | Plastic |
| L4A2 | | -15.416 | 0.154 | | | | |
| L5A1 | 5th lens element | -4.158 | 0.691 | 1.545 | 55.987 | -21.310 | Plastic |
| L5A2 | | -6.847 | 0.173 | | | | |
| L6A1 | 6th lens element | 2.595 | 0.300 | 1.545 | 55.987 | 26.378 | Plastic |
| L6A2 | | 3.036 | 0.498 | | | | |
| L7A1 | 7th lens element | 4.681 | 0.334 | 1.545 | 55.987 | 5.020 | Plastic |
| L7A2 | | -6.455 | 0.817 | | | | |
| L8A1 | 8th lens element | -3.505 | 0.384 | 1.545 | 55.987 | -3.237 | Plastic |
| L8A2 | | 3.707 | 0.587 | | | | |
| TFA1 | Filtering unit | INFINITY | 0.210 | 1.517 | 64.167 | | |
| TFA2 | | INFINITY | 0.170 | | | | |
| IMA | Image plane | INFINITY | | | | | |

FIG. 8

| Embodiment 1 | | | | | |
|---|---|---|---|---|---|
| Aspherical Parameters | | | | | |
| Surface# | K | $a_4$ | $a_6$ | $a_8$ | $a_{10}$ |
| L1A1 | -1.557756E-01 | -6.706218E-05 | -1.346033E-03 | 7.182267E-04 | -4.505020E-04 |
| L1A2 | 0.000000E+00 | -1.720777E-02 | 6.671955E-03 | 2.381660E-03 | -3.673634E-03 |
| L2A1 | 0.000000E+00 | -2.233990E-02 | 1.918420E-02 | -2.654839E-03 | -2.578102E-03 |
| L2A2 | 5.721347E+00 | -2.393577E-02 | 1.781181E-02 | -1.082551E-02 | 6.424463E-03 |
| L3A1 | 0.000000E+00 | -1.259481E-02 | -1.151350E-02 | 1.921778E-02 | -1.520393E-02 |
| L3A2 | 0.000000E+00 | -6.889278E-03 | -1.697748E-02 | 1.600955E-02 | -1.051249E-02 |
| L4A1 | 0.000000E+00 | -8.520382E-03 | -6.850674E-02 | 6.318344E-02 | -2.985003E-02 |
| L4A2 | 0.000000E+00 | 1.069036E-01 | -2.778704E-01 | 3.503953E-01 | -2.969971E-01 |
| L5A1 | 0.000000E+00 | 1.623610E-01 | -3.020489E-01 | 3.493956E-01 | -2.694309E-01 |
| L5A2 | 0.000000E+00 | 2.438300E-02 | -1.034749E-01 | 1.047598E-01 | -6.941495E-02 |
| L6A1 | 0.000000E+00 | -3.653059E-02 | -1.145394E-02 | 1.033838E-02 | -5.212302E-03 |
| L6A2 | 0.000000E+00 | -4.136130E-02 | -3.323644E-03 | 6.537214E-03 | -3.661499E-03 |
| L7A1 | 0.000000E+00 | 7.557377E-03 | -1.147130E-02 | 3.133026E-03 | -1.007322E-03 |
| L7A2 | 4.083889E+00 | 5.919286E-02 | -1.310084E-02 | 8.368934E-04 | 8.005224E-06 |
| L8A1 | -9.394650E-01 | -2.129716E-02 | 5.227415E-03 | -7.903655E-04 | 6.865050E-05 |
| L8A2 | -1.396544E+01 | -1.630166E-02 | 3.649796E-03 | -5.554017E-04 | 4.774664E-05 |
| Surface# | $a_{12}$ | $a_{14}$ | $a_{16}$ | $a_{18}$ | $a_{20}$ |
| L1A1 | -1.640482E-05 | 2.013596E-05 | 6.854372E-06 | | |
| L1A2 | 1.601253E-03 | -2.919487E-04 | 2.487755E-05 | | |
| L2A1 | 1.814304E-03 | -4.705590E-04 | 3.429693E-05 | | |
| L2A2 | -2.780667E-03 | 6.812112E-04 | -1.032554E-04 | | |
| L3A1 | 7.263088E-03 | -1.757681E-03 | 1.711210E-04 | | |
| L3A2 | 4.330865E-03 | -9.730398E-04 | 9.934215E-05 | | |
| L4A1 | -6.119875E-03 | 1.474525E-02 | -7.311297E-03 | 1.625985E-03 | -1.440478E-04 |
| L4A2 | 1.662500E-01 | -6.033541E-02 | 1.365030E-02 | -1.755118E-03 | 9.832206E-05 |
| L5A1 | 1.382002E-01 | -4.624702E-02 | 9.637379E-03 | -1.131882E-03 | 5.717519E-05 |
| L5A2 | 3.099526E-02 | -9.078817E-03 | 1.650878E-03 | -1.679180E-04 | 7.253872E-06 |
| L6A1 | 1.558495E-03 | -3.022790E-04 | 3.562031E-05 | -2.271027E-06 | 4.102921E-08 |
| L6A2 | 1.103904E-03 | -1.998806E-04 | 2.087713E-05 | -1.201590E-06 | 3.500344E-08 |
| L7A1 | 2.262853E-04 | -3.664183E-05 | 3.577272E-06 | -1.140368E-07 | -1.199063E-08 |
| L7A2 | -1.016500E-05 | 1.258059E-06 | -7.274353E-08 | 3.838917E-09 | 1.731080E-10 |
| L8A1 | -4.175489E-06 | 3.600138E-07 | -1.628158E-08 | -5.971730E-10 | -3.497100E-11 |
| L8A2 | -2.233380E-06 | 4.234639E-08 | 7.166840E-10 | -4.738200E-11 | 6.190000E-13 |

FIG. 9

| Embodiment 2 ||||||||
|---|---|---|---|---|---|---|---|
| EFL = 6.822 mm；HFOV = 43.204 degrees；TTL = 8.006 mm ||||||||
| Fno = 1.649；Image Height = 6.700 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.797 | | | | |
| L1A1 | 1st lens element | 2.890 | 0.758 | 1.545 | 55.987 | 8.803 | Plastic |
| L1A2 | | 6.574 | 0.084 | | | | |
| L2A1 | 2nd lens element | 4.616 | 0.200 | 1.671 | 19.243 | -39.928 | Plastic |
| L2A2 | | 3.874 | 0.206 | | | | |
| L3A1 | 3rd lens element | 7.011 | 0.425 | 1.545 | 55.987 | 29.876 | Plastic |
| L3A2 | | 12.029 | 0.461 | | | | |
| L4A1 | 4th lens element | 11.696 | 0.204 | 1.671 | 19.243 | 294.597 | Plastic |
| L4A2 | | 12.336 | 0.097 | | | | |
| L5A1 | 5th lens element | -36.172 | 0.603 | 1.545 | 55.987 | -2382.562 | Plastic |
| L5A2 | | -37.425 | 0.109 | | | | |
| L6A1 | 6th lens element | 5.719 | 0.222 | 1.545 | 55.987 | 44.911 | Plastic |
| L6A2 | | 7.355 | 0.662 | | | | |
| L7A1 | 7th lens element | 28.484 | 1.546 | 1.545 | 55.987 | 6.636 | Plastic |
| L7A2 | | -4.074 | 0.699 | | | | |
| L8A1 | 8th lens element | -5.294 | 0.445 | 1.545 | 55.987 | -3.662 | Plastic |
| L8A2 | | 3.311 | 0.582 | | | | |
| TFA1 | Filtering unit | INFINITY | 0.210 | 1.517 | 64.167 | | |
| TFA2 | | INFINITY | 0.495 | | | | |
| IMA | Image plane | INFINITY | | | | | |

FIG. 12

| Embodiment 2 |||||
|---|---|---|---|---|
| Aspherical Parameters |||||
| Surface# | K | $a_4$ | $a_6$ | $a_8$ | $a_{10}$ |
| L1A1 | -1.813776E-01 | 2.914519E-04 | 6.913399E-04 | -8.998201E-04 | 7.100016E-04 |
| L1A2 | 0.000000E+00 | -1.270598E-02 | 1.413746E-02 | -1.115872E-02 | 5.445526E-03 |
| L2A1 | 0.000000E+00 | -1.943633E-02 | 2.061416E-02 | -1.700036E-02 | 8.733880E-03 |
| L2A2 | 2.132525E+00 | -1.460589E-02 | 1.287734E-02 | -1.228117E-02 | 6.537421E-03 |
| L3A1 | 0.000000E+00 | 5.273997E-05 | -2.263125E-03 | 3.916713E-03 | -2.832662E-03 |
| L3A2 | 0.000000E+00 | -5.136924E-03 | 5.311307E-03 | -7.820733E-03 | 6.180752E-03 |
| L4A1 | 0.000000E+00 | 3.953307E-04 | -6.516950E-02 | 1.028000E-01 | -1.064767E-01 |
| L4A2 | 0.000000E+00 | 1.916870E-02 | -8.184671E-02 | 9.868940E-02 | -7.739709E-02 |
| L5A1 | 0.000000E+00 | 2.886683E-02 | -6.059554E-02 | 5.536818E-02 | -2.824546E-02 |
| L5A2 | 0.000000E+00 | -1.657423E-02 | 8.943337E-03 | -2.123566E-02 | 1.889824E-02 |
| L6A1 | 0.000000E+00 | -4.300869E-02 | 2.274719E-02 | -1.246724E-02 | 2.751147E-03 |
| L6A2 | 0.000000E+00 | -3.949357E-02 | 1.888627E-02 | -6.549912E-03 | -5.519509E-05 |
| L7A1 | 0.000000E+00 | -3.682332E-03 | -1.211280E-02 | 1.203383E-02 | -8.062936E-03 |
| L7A2 | -1.577542E+01 | -1.063806E-03 | 7.153313E-04 | -6.968687E-04 | 2.314555E-04 |
| L8A1 | 0.000000E+00 | -2.581793E-02 | 6.645996E-03 | -1.863302E-03 | 3.920805E-04 |
| L8A2 | -1.916667E+01 | -1.277324E-02 | 1.492546E-03 | -1.176344E-04 | 1.452501E-06 |
| Surface# | $a_{12}$ | $a_{14}$ | $a_{16}$ | $a_{18}$ | $a_{20}$ |
| L1A1 | -3.095088E-04 | 6.623816E-05 | -5.560124E-06 | / | / |
| L1A2 | -1.534488E-03 | 2.370900E-04 | -1.573445E-05 | / | / |
| L2A1 | -2.454795E-03 | 3.512634E-04 | -1.962185E-05 | / | / |
| L2A2 | -1.809826E-03 | 2.537517E-04 | -1.510466E-05 | / | / |
| L3A1 | 1.245816E-03 | -2.361320E-04 | 1.683569E-05 | / | / |
| L3A2 | -2.478299E-03 | 5.148126E-04 | -3.937208E-05 | / | / |
| L4A1 | 6.906746E-02 | -2.856187E-02 | 7.304588E-03 | -1.044810E-03 | 6.348339E-05 |
| L4A2 | 3.901061E-02 | -1.292918E-02 | 2.762061E-03 | -3.422078E-04 | 1.841178E-05 |
| L5A1 | 7.461439E-03 | -5.510997E-04 | -1.918099E-04 | 4.922742E-05 | -3.504717E-06 |
| L5A2 | -9.783699E-03 | 3.223193E-03 | -6.602170E-04 | 7.579805E-05 | -3.650472E-06 |
| L6A1 | 6.390408E-05 | -1.315804E-04 | 2.476028E-05 | -2.339711E-06 | 1.078862E-07 |
| L6A2 | 7.188860E-04 | -2.080674E-04 | 2.639001E-05 | -1.588174E-06 | 3.650379E-08 |
| L7A1 | 3.424892E-03 | -9.288451E-04 | 1.549018E-04 | -1.448645E-05 | 5.797969E-07 |
| L7A2 | -4.139647E-05 | 4.415061E-06 | -2.833157E-07 | 1.015873E-08 | -1.569400E-10 |
| L8A1 | -4.866987E-05 | 3.599056E-06 | -1.576915E-07 | 3.795801E-09 | -3.881300E-11 |
| L8A2 | 6.905317E-07 | -7.409710E-08 | 3.549278E-09 | -8.289400E-11 | 7.590000E-13 |

FIG. 13

| Embodiment 3 ||||||||
| --- | --- | --- | --- | --- | --- | --- | --- |
| EFL = 5.304 mm ; HFOV = 47.931 degrees ; TTL = 7.701 mm ||||||||
| Fno = 1.649 ; Image Height = 6.700 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.422 | | | | |
| L1A1 | 1st lens element | 3.070 | 0.529 | 1.545 | 55.987 | 8.778 | Plastic |
| L1A2 | | 8.010 | 0.139 | | | | |
| L2A1 | 2nd lens element | 5.579 | 0.215 | 1.671 | 19.243 | -35.242 | Plastic |
| L2A2 | | 4.452 | 0.171 | | | | |
| L3A1 | 3rd lens element | 9.436 | 0.367 | 1.545 | 55.987 | 32.879 | Plastic |
| L3A2 | | 19.608 | 0.532 | | | | |
| L4A1 | 4th lens element | 37.851 | 0.290 | 1.671 | 19.243 | -116.924 | Plastic |
| L4A2 | | 25.534 | 0.114 | | | | |
| L5A1 | 5th lens element | -13.735 | 0.472 | 1.545 | 55.987 | -382.060 | Plastic |
| L5A2 | | -14.881 | 0.350 | | | | |
| L6A1 | 6th lens element | 7.639 | 0.613 | 1.545 | 55.987 | 31.994 | Plastic |
| L6A2 | | 13.186 | 0.478 | | | | |
| L7A1 | 7th lens element | 10.634 | 0.588 | 1.545 | 55.987 | 5.365 | Plastic |
| L7A2 | | -3.967 | 1.102 | | | | |
| L8A1 | 8th lens element | -6.052 | 0.899 | 1.545 | 55.987 | -4.217 | Plastic |
| L8A2 | | 3.915 | 0.582 | | | | |
| TFA1 | Filtering unit | INFINITY | 0.210 | 1.517 | 64.167 | | |
| TFA2 | | INFINITY | 0.050 | | | | |
| IMA | Image plane | INFINITY | | | | | |

FIG. 16

| Embodiment 3 | | | | | |
|---|---|---|---|---|---|
| Aspherical Parameters | | | | | |
| Surface# | K | $a_4$ | $a_6$ | $a_8$ | $a_{10}$ |
| L1A1 | -9.811584E-02 | 1.304174E-06 | 1.447080E-03 | -1.416902E-03 | 7.002650E-04 |
| L1A2 | 0.000000E+00 | -9.258958E-03 | 4.747609E-03 | -5.835003E-04 | -4.470346E-04 |
| L2A1 | 0.000000E+00 | -2.228234E-02 | 1.754901E-02 | -1.101010E-02 | 5.514830E-03 |
| L2A2 | 2.024184E+00 | -1.639846E-02 | 1.015622E-02 | -5.363726E-03 | 1.355106E-03 |
| L3A1 | 0.000000E+00 | -8.184782E-04 | 6.303537E-03 | -1.000486E-02 | 8.308892E-03 |
| L3A2 | 0.000000E+00 | -1.360650E-04 | -2.761615E-03 | 2.935005E-03 | -2.458574E-03 |
| L4A1 | 0.000000E+00 | -1.860524E-02 | -8.329070E-03 | -5.058859E-03 | 7.999625E-03 |
| L4A2 | 0.000000E+00 | 1.396792E-02 | -3.831788E-02 | 1.713937E-02 | -1.308178E-03 |
| L5A1 | 0.000000E+00 | 3.295740E-02 | -4.415178E-02 | 1.597708E-02 | 1.811858E-03 |
| L5A2 | 0.000000E+00 | 9.210702E-03 | -4.168379E-02 | 3.406165E-02 | -1.972432E-02 |
| L6A1 | 0.000000E+00 | -5.416442E-03 | -1.140083E-02 | 5.771399E-03 | -1.582903E-03 |
| L6A2 | 0.000000E+00 | -2.034709E-02 | 2.224696E-03 | -4.851279E-03 | 3.171178E-03 |
| L7A1 | 0.000000E+00 | -3.121591E-03 | 7.325586E-03 | -5.604743E-03 | 1.476216E-03 |
| L7A2 | -6.231007E+01 | -4.947954E-02 | 4.845134E-02 | -2.232918E-02 | 5.839157E-03 |
| L8A1 | 0.000000E+00 | -4.560448E-03 | -5.369505E-03 | 1.765520E-03 | -2.612260E-04 |
| L8A2 | -5.247490E+00 | -3.038242E-03 | -1.161353E-03 | 2.620188E-04 | -2.554674E-05 |
| Surface# | $a_{12}$ | $a_{14}$ | $a_{16}$ | $a_{18}$ | $a_{20}$ |
| L1A1 | -1.855905E-04 | 2.916601E-05 | -2.096605E-06 | | |
| L1A2 | 2.806925E-04 | -4.939308E-05 | 2.005366E-06 | | |
| L2A1 | -1.628941E-03 | 2.326804E-04 | -1.073908E-05 | | |
| L2A2 | -4.186934E-04 | 2.637642E-04 | -5.494965E-05 | | |
| L3A1 | -4.820945E-03 | 1.723182E-03 | -2.399100E-04 | | |
| L3A2 | 7.975493E-04 | 1.519573E-05 | -2.511999E-05 | | |
| L4A1 | -3.381421E-03 | -1.223981E-03 | 1.458931E-03 | -4.424729E-04 | 4.664987E-05 |
| L4A2 | -2.576593E-03 | 1.232820E-03 | -2.072433E-04 | 5.328116E-06 | 1.372161E-06 |
| L5A1 | -3.665160E-03 | 1.541818E-03 | -3.468051E-04 | 4.251221E-05 | -2.226787E-06 |
| L5A2 | 7.937961E-03 | -2.054184E-03 | 3.203510E-04 | -2.685356E-05 | 9.025090E-07 |
| L6A1 | 2.392371E-04 | -1.151166E-05 | -1.757943E-06 | 2.661792E-07 | -1.032542E-08 |
| L6A2 | -1.031559E-03 | 1.961272E-04 | -2.190253E-05 | 1.322596E-06 | -3.320024E-08 |
| L7A1 | -1.680975E-04 | 3.241790E-06 | 1.035333E-06 | -9.107701E-08 | 2.356779E-09 |
| L7A2 | -9.295841E-04 | 9.135015E-05 | -5.400308E-06 | 1.759848E-07 | -2.429693E-09 |
| L8A1 | 2.337459E-05 | -1.324497E-06 | 4.623753E-08 | -9.051800E-10 | 7.597000E-12 |
| L8A2 | 1.427894E-06 | -4.878836E-08 | 1.006292E-09 | -1.148300E-11 | 5.600000E-14 |

FIG. 17

| Embodiment 4 ||||||||
| --- | --- | --- | --- | --- | --- | --- | --- |
| EFL = 7.278 mm ; HFOV = 37.304 degrees ; TTL = 8.541 mm ||||||||
| Fno = 1.649 ; Image Height = 6.700 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -1.074 | | | | |
| L1A1 | 1st lens element | 2.892 | 1.194 | 1.545 | 55.987 | 5.835 | Plastic |
| L1A2 | | 26.640 | 0.050 | | | | |
| L2A1 | 2nd lens element | 10.466 | 0.344 | 1.671 | 19.243 | -12.356 | Plastic |
| L2A2 | | 4.589 | 0.418 | | | | |
| L3A1 | 3rd lens element | -844.650 | 0.350 | 1.545 | 55.987 | 61.646 | Plastic |
| L3A2 | | -32.389 | 0.302 | | | | |
| L4A1 | 4th lens element | 20.069 | 0.353 | 1.671 | 19.243 | 76.964 | Plastic |
| L4A2 | | 32.394 | 0.308 | | | | |
| L5A1 | 5th lens element | -9.034 | 0.498 | 1.545 | 55.987 | -204.868 | Plastic |
| L5A2 | | -10.018 | 0.304 | | | | |
| L6A1 | 6th lens element | 6.091 | 0.271 | 1.545 | 55.987 | 64.439 | Plastic |
| L6A2 | | 7.251 | 0.534 | | | | |
| L7A1 | 7th lens element | 19.497 | 0.491 | 1.545 | 55.987 | 9.707 | Plastic |
| L7A2 | | -7.218 | 0.556 | | | | |
| L8A1 | 8th lens element | -14.462 | 1.196 | 1.545 | 55.987 | -4.909 | Plastic |
| L8A2 | | 3.388 | 0.582 | | | | |
| TFA1 | Filtering unit | INFINITY | 0.210 | 1.517 | 64.167 | | |
| TFA2 | | INFINITY | 0.581 | | | | |
| IMA | Image plane | INFINITY | | | | | |

FIG. 20

| Embodiment 4 |||||
|---|---|---|---|---|
| Aspherical Parameters |||||
| Surface# | K | $a_4$ | $a_6$ | $a_8$ | $a_{10}$ |
| L1A1 | -4.466786E-02 | 8.320109E-04 | 1.621907E-04 | -1.570340E-05 | 2.756864E-05 |
| L1A2 | 0.000000E+00 | -1.432902E-02 | 1.229015E-02 | -4.900114E-03 | 1.214411E-03 |
| L2A1 | 0.000000E+00 | -2.057766E-02 | 1.166865E-02 | -2.854115E-03 | 7.407126E-05 |
| L2A2 | 2.341719E+00 | -8.656580E-03 | 2.836565E-04 | 1.872900E-03 | -1.205584E-03 |
| L3A1 | 0.000000E+00 | 2.607571E-03 | -7.834055E-03 | 4.664820E-03 | -1.558651E-03 |
| L3A2 | 0.000000E+00 | 1.076050E-04 | -1.098244E-02 | 9.280194E-03 | -4.307520E-03 |
| L4A1 | 0.000000E+00 | -1.558790E-02 | -1.859919E-02 | 1.240611E-02 | -6.534540E-03 |
| L4A2 | 0.000000E+00 | -6.747632E-03 | -2.224988E-02 | 1.647602E-02 | -1.200074E-02 |
| L5A1 | 0.000000E+00 | 8.963813E-03 | -1.863824E-02 | 1.171437E-02 | -7.364194E-03 |
| L5A2 | 0.000000E+00 | -6.803812E-03 | -1.300945E-02 | 7.889975E-03 | -4.452520E-03 |
| L6A1 | 0.000000E+00 | -1.688162E-02 | -1.714779E-02 | 1.878540E-02 | -1.185233E-02 |
| L6A2 | 0.000000E+00 | -1.626842E-02 | -1.996422E-02 | 2.024775E-02 | -1.114571E-02 |
| L7A1 | 0.000000E+00 | 1.946980E-02 | -2.043176E-02 | 5.829803E-03 | -1.434182E-03 |
| L7A2 | -8.620166E+01 | 1.098056E-02 | 1.028357E-03 | -7.020688E-03 | 3.423308E-03 |
| L8A1 | 0.000000E+00 | -2.593467E-02 | 3.490662E-03 | -8.067605E-04 | 1.471346E-04 |
| L8A2 | -9.712263E+00 | -1.323616E-02 | 2.006133E-03 | -2.541844E-04 | 2.523757E-05 |
| Surface# | $a_{12}$ | $a_{14}$ | $a_{16}$ | $a_{18}$ | $a_{20}$ |
| L1A1 | -4.582820E-06 | -9.072022E-08 | 1.159455E-07 | | |
| L1A2 | -1.763677E-04 | 1.325667E-05 | -3.571412E-07 | | |
| L2A1 | 1.625925E-04 | -4.013145E-05 | 3.067143E-06 | | |
| L2A2 | 3.870862E-04 | -5.474378E-05 | 1.486981E-06 | | |
| L3A1 | 4.941806E-04 | -1.003205E-04 | 8.718205E-06 | | |
| L3A2 | 1.585845E-03 | -3.714871E-04 | 3.834681E-05 | | |
| L4A1 | 2.205209E-03 | -2.755323E-04 | -1.233046E-04 | 5.033038E-05 | -5.077937E-06 |
| L4A2 | 7.124575E-03 | -2.867910E-03 | 7.118282E-04 | -9.808462E-05 | 5.793883E-06 |
| L5A1 | 3.833530E-03 | -1.185412E-03 | 2.081346E-04 | -1.975591E-05 | 8.015881E-07 |
| L5A2 | 2.030855E-03 | -5.780132E-04 | 1.002523E-04 | -1.001005E-05 | 4.383315E-07 |
| L6A1 | 4.305781E-03 | -9.096670E-04 | 1.110625E-04 | -7.238296E-06 | 1.909971E-07 |
| L6A2 | 3.637676E-03 | -7.147895E-04 | 8.356822E-05 | -5.371183E-06 | 1.459501E-07 |
| L7A1 | 4.196038E-04 | -1.060806E-04 | 1.650842E-05 | -1.415635E-06 | 5.322264E-08 |
| L7A2 | -7.991174E-04 | 1.040640E-04 | -7.610144E-06 | 2.863680E-07 | -4.154274E-09 |
| L8A1 | 1.430872E-05 | -8.855347E-06 | 1.215037E-06 | -7.042143E-08 | 1.474441E-09 |
| L8A2 | -1.908136E-06 | 1.019821E-07 | -3.550080E-09 | 7.141900E-11 | -6.270000E-13 |

FIG. 21

| Embodiment 5 ||||||||
|---|---|---|---|---|---|---|---|
| EFL = 6.661 mm ; HFOV = 39.524 degrees ; TTL = 7.818 mm ||||||||
| Fno = 1.649 ; Image Height = 5.800 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.990 | | | | |
| L1A1 | 1st lens element | 2.557 | 1.147 | 1.545 | 55.987 | 5.828 | Plastic |
| L1A2 | | 10.934 | 0.063 | | | | |
| L2A1 | 2nd lens element | 11.390 | 0.217 | 1.671 | 19.243 | -13.701 | Plastic |
| L2A2 | | 5.075 | 0.287 | | | | |
| L3A1 | 3rd lens element | 6.093 | 0.371 | 1.545 | 55.987 | 33.690 | Plastic |
| L3A2 | | 8.913 | 0.505 | | | | |
| L4A1 | 4th lens element | -16.096 | 0.284 | 1.671 | 19.243 | 31.124 | Plastic |
| L4A2 | | -9.193 | 0.075 | | | | |
| L5A1 | 5th lens element | -8.884 | 0.411 | 1.545 | 55.987 | -17.146 | Plastic |
| L5A2 | | -175.541 | 0.364 | | | | |
| L6A1 | 6th lens element | 11.119 | 0.413 | 1.545 | 55.987 | 5289.440 | Plastic |
| L6A2 | | 11.015 | 0.405 | | | | |
| L7A1 | 7th lens element | 4.367 | 0.961 | 1.544 | 49.922 | 6.038 | Plastic |
| L7A2 | | -12.447 | 0.565 | | | | |
| L8A1 | 8th lens element | -8.304 | 0.495 | 1.545 | 55.987 | -4.233 | Plastic |
| L8A2 | | 3.272 | 0.587 | | | | |
| TFA1 | Filtering unit | INFINITY | 0.210 | 1.517 | 64.167 | | |
| TFA2 | | INFINITY | 0.459 | | | | |
| IMA | Image plane | INFINITY | | | | | |

FIG. 24

| Embodiment 5 | | | | | |
|---|---|---|---|---|---|
| Aspherical Parameters | | | | | |
| Surface# | K | $a_4$ | $a_6$ | $a_8$ | $a_{10}$ |
| L1A1 | 5.748473E-02 | 3.349936E-04 | 5.594019E-04 | -6.095193E-04 | 5.003518E-04 |
| L1A2 | 0.000000E+00 | -1.573436E-02 | 1.112393E-02 | -3.977036E-03 | 5.379838E-04 |
| L2A1 | 0.000000E+00 | -2.572572E-02 | 2.204246E-02 | -9.412077E-03 | 2.640820E-03 |
| L2A2 | 6.610630E+00 | -2.112016E-02 | 1.603389E-02 | -1.179476E-02 | 7.681851E-03 |
| L3A1 | 0.000000E+00 | -1.164907E-02 | -7.634794E-03 | 8.114215E-03 | -6.380377E-03 |
| L3A2 | 0.000000E+00 | -7.727240E-03 | -5.542237E-03 | -5.301070E-05 | 2.324043E-03 |
| L4A1 | 0.000000E+00 | 7.896012E-03 | -5.511552E-02 | 5.904140E-02 | -4.846736E-02 |
| L4A2 | 0.000000E+00 | 9.842014E-02 | -2.066590E-01 | 2.323420E-01 | -1.835315E-01 |
| L5A1 | 0.000000E+00 | 1.186490E-01 | -2.450811E-01 | 2.704078E-01 | -2.033595E-01 |
| L5A2 | 0.000000E+00 | 1.467445E-02 | -5.768414E-02 | 5.243829E-02 | -3.288764E-02 |
| L6A1 | 0.000000E+00 | -1.810814E-02 | 6.643390E-04 | 2.325666E-03 | -2.592570E-03 |
| L6A2 | 0.000000E+00 | -5.400055E-02 | 1.448486E-02 | -1.706055E-03 | -9.103458E-04 |
| L7A1 | 0.000000E+00 | -1.795082E-02 | -4.746748E-03 | 1.463713E-03 | -6.595715E-04 |
| L7A2 | 8.107967E+00 | 4.518916E-02 | -1.547685E-02 | 2.034665E-03 | -1.841738E-05 |
| L8A1 | -1.707398E-01 | -2.843054E-02 | 7.133845E-03 | -1.192001E-03 | 1.573765E-04 |
| L8A2 | -1.294022E+01 | -2.610259E-02 | 5.773636E-03 | -1.083284E-03 | 1.466790E-04 |
| Surface# | $a_{12}$ | $a_{14}$ | $a_{16}$ | $a_{18}$ | $a_{20}$ |
| L1A1 | -2.141708E-04 | 4.865526E-05 | -4.875269E-06 | | |
| L1A2 | 1.170555E-04 | -4.778136E-05 | 4.285284E-06 | | |
| L2A1 | -3.761633E-04 | 2.720247E-05 | -6.395916E-07 | | |
| L2A2 | -3.384126E-03 | 8.793639E-04 | -9.023998E-05 | | |
| L3A1 | 3.212093E-03 | -7.708682E-04 | 7.572223E-05 | | |
| L3A2 | -1.719980E-03 | 6.666591E-04 | -1.032439E-04 | | |
| L4A1 | 2.444651E-02 | -6.975354E-03 | 9.392525E-04 | -1.065217E-05 | -7.921273E-06 |
| L4A2 | 9.808124E-02 | -3.450787E-02 | 7.689298E-03 | -9.922590E-04 | 5.734894E-05 |
| L5A1 | 1.042296E-01 | -3.533251E-02 | 7.512770E-03 | -9.008164E-04 | 4.619062E-05 |
| L5A2 | 1.454426E-02 | -4.343206E-03 | 8.180378E-04 | -8.622437E-05 | 3.829021E-06 |
| L6A1 | 1.249913E-03 | -3.327176E-04 | 5.104571E-05 | -4.260909E-06 | 1.505439E-07 |
| L6A2 | 5.535284E-04 | -1.316519E-04 | 1.632205E-05 | -1.045934E-06 | 2.749394E-08 |
| L7A1 | 2.280540E-04 | -4.538640E-05 | 5.053247E-06 | -2.899670E-07 | 6.599411E-09 |
| L7A2 | -3.765706E-05 | 6.243113E-06 | -4.840801E-07 | 1.899410E-08 | -3.025040E-10 |
| L8A1 | -1.443211E-05 | 8.553248E-07 | -3.117230E-08 | 6.359260E-10 | -5.565000E-12 |
| L8A2 | -1.296157E-05 | 7.196887E-07 | -2.412259E-08 | 4.457020E-10 | -3.488000E-12 |

FIG. 25

| Embodiment 6 ||||||||
|---|---|---|---|---|---|---|---|
| EFL = 7.843 mm ; HFOV = 34.794 degrees ; TTL = 9.204 mm ||||||||
| Fno = 1.649 ; Image Height = 5.800 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -1.101 | | | | |
| L1A1 | 1st lens element | 2.943 | 1.332 | 1.545 | 55.987 | 5.940 | Plastic |
| L1A2 | | 26.569 | 0.188 | | | | |
| L2A1 | 2nd lens element | 25.161 | 0.200 | 1.671 | 19.243 | -12.029 | Plastic |
| L2A2 | | 6.136 | 0.382 | | | | |
| L3A1 | 3rd lens element | 7.648 | 0.365 | 1.545 | 55.987 | 43.777 | Plastic |
| L3A2 | | 11.054 | 0.672 | | | | |
| L4A1 | 4th lens element | -10.371 | 0.407 | 1.671 | 19.243 | 40.261 | Plastic |
| L4A2 | | -7.633 | 0.163 | | | | |
| L5A1 | 5th lens element | -5.103 | 0.413 | 1.545 | 55.987 | -15.829 | Plastic |
| L5A2 | | -12.809 | 0.452 | | | | |
| L6A1 | 6th lens element | 8.241 | 0.438 | 1.545 | 55.987 | 56.896 | Plastic |
| L6A2 | | 11.003 | 0.407 | | | | |
| L7A1 | 7th lens element | 4.439 | 1.045 | 1.545 | 55.987 | 5.858 | Plastic |
| L7A2 | | -10.516 | 0.401 | | | | |
| L8A1 | 8th lens element | -4.885 | 0.859 | 1.545 | 55.987 | -4.176 | Plastic |
| L8A2 | | 4.545 | 0.587 | | | | |
| TFA1 | Filtering unit | INFINITY | 0.210 | 1.517 | 64.167 | | |
| TFA2 | | INFINITY | 0.682 | | | | |
| IMA | Image plane | INFINITY | | | | | |

FIG. 28

| Embodiment 6 | | | | | |
|---|---|---|---|---|---|
| Aspherical Parameters | | | | | |
| Surface# | K | $a_4$ | $a_6$ | $a_8$ | $a_{10}$ |
| L1A1 | 9.067191E-02 | 1.523250E-05 | 1.002772E-04 | -1.309880E-04 | 8.462778E-05 |
| L1A2 | 0.000000E+00 | -6.649271E-03 | 4.269501E-03 | -1.588668E-03 | 3.999754E-04 |
| L2A1 | 0.000000E+00 | -2.411060E-02 | 2.180247E-02 | -9.426599E-03 | 2.847042E-03 |
| L2A2 | 6.042292E+00 | -2.446770E-02 | 2.025230E-02 | -9.196967E-03 | 3.368811E-03 |
| L3A1 | 0.000000E+00 | -1.259337E-02 | -2.415284E-03 | 2.431457E-03 | -8.053870E-04 |
| L3A2 | 0.000000E+00 | -9.441497E-03 | -2.731083E-03 | 1.058150E-04 | 1.165361E-03 |
| L4A1 | 0.000000E+00 | -7.633038E-03 | -2.316084E-02 | 2.227294E-02 | -1.876773E-02 |
| L4A2 | 0.000000E+00 | 3.226348E-02 | -6.550567E-02 | 5.444398E-02 | -3.674975E-02 |
| L5A1 | 0.000000E+00 | 6.316003E-02 | -9.620653E-02 | 7.404351E-02 | -4.456167E-02 |
| L5A2 | 0.000000E+00 | 1.358094E-02 | -3.747407E-02 | 2.454678E-02 | -1.138357E-02 |
| L6A1 | 0.000000E+00 | -2.259270E-02 | 1.082368E-02 | -7.125561E-03 | 2.928626E-03 |
| L6A2 | 0.000000E+00 | -5.639878E-02 | 2.680525E-02 | -1.207741E-02 | 3.956496E-03 |
| L7A1 | 0.000000E+00 | -3.385781E-02 | 7.745531E-03 | -3.862007E-03 | 1.307538E-03 |
| L7A2 | 7.258053E+00 | 2.001393E-02 | -8.634745E-03 | 1.330247E-03 | -8.644502E-05 |
| L8A1 | -5.613687E+00 | -1.377333E-02 | -6.327317E-04 | 8.206285E-04 | -1.321818E-04 |
| L8A2 | -1.361945E+01 | -1.400388E-02 | 2.215604E-03 | -1.827296E-04 | 7.159954E-06 |
| Surface# | $a_{12}$ | $a_{14}$ | $a_{16}$ | $a_{18}$ | $a_{20}$ |
| L1A1 | -3.285505E-05 | 6.301188E-06 | -5.676894E-07 | | |
| L1A2 | -7.382458E-05 | 8.424267E-06 | -4.598434E-07 | | |
| L2A1 | -5.543013E-04 | 6.419698E-05 | -3.235974E-06 | | |
| L2A2 | -8.242710E-04 | 1.257101E-04 | -7.216159E-06 | | |
| L3A1 | 2.413429E-04 | -4.240536E-05 | 3.666358E-06 | | |
| L3A2 | -6.261695E-04 | 1.483849E-04 | -1.476595E-05 | | |
| L4A1 | 1.164789E-02 | -4.840545E-03 | 1.263431E-03 | -1.880010E-04 | 1.211336E-05 |
| L4A2 | 1.905084E-02 | -6.780255E-03 | 1.515739E-03 | -1.903570E-04 | 1.019932E-05 |
| L5A1 | 2.099684E-02 | -6.990350E-03 | 1.475453E-03 | -1.735918E-04 | 8.539727E-06 |
| L5A2 | 4.069960E-03 | -1.079039E-03 | 1.910610E-04 | -1.948385E-05 | 8.514100E-07 |
| L6A1 | -7.542244E-04 | 1.222148E-04 | -1.195038E-05 | 6.371370E-07 | -1.419593E-08 |
| L6A2 | -8.731425E-04 | 1.278717E-04 | -1.184403E-05 | 6.221715E-07 | -1.405520E-08 |
| L7A1 | -3.009826E-04 | 4.658647E-05 | -4.587786E-06 | 2.560137E-07 | -6.075382E-09 |
| L7A2 | -2.170646E-06 | 8.151968E-07 | -5.824808E-08 | 1.591118E-09 | -3.699000E-12 |
| L8A1 | 1.052779E-05 | -4.719890E-07 | 1.155763E-08 | -1.270300E-10 | 2.160000E-13 |
| L8A2 | -6.661780E-09 | -1.084021E-08 | 4.164820E-10 | -6.287000E-12 | 3.100000E-14 |

FIG. 29

| Embodiment 7 ||||||||
| --- | --- | --- | --- | --- | --- | --- | --- |
| EFL = 6.230 mm ; HFOV = 36.695 degrees ; TTL = 7.760 mm ||||||||
| Fno = 1.649 ; Image Height = 5.800 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -0.736 | | | | |
| L1A1 | 1st lens element | 2.595 | 0.984 | 1.545 | 55.987 | 5.908 | Plastic |
| L1A2 | | 11.475 | 0.107 | | | | |
| L2A1 | 2nd lens element | 11.421 | 0.220 | 1.671 | 19.243 | -13.735 | Plastic |
| L2A2 | | 5.088 | 0.312 | | | | |
| L3A1 | 3rd lens element | 5.887 | 0.451 | 1.545 | 55.987 | 19.792 | Plastic |
| L3A2 | | 12.572 | 0.602 | | | | |
| L4A1 | 4th lens element | -7.496 | 0.321 | 1.671 | 19.243 | 29.126 | Plastic |
| L4A2 | | -5.527 | 0.356 | | | | |
| L5A1 | 5th lens element | -2.942 | 0.468 | 1.545 | 55.987 | -18.929 | Plastic |
| L5A2 | | -4.343 | 0.394 | | | | |
| L6A1 | 6th lens element | 4.131 | 0.300 | 1.545 | 55.987 | 2888.198 | Plastic |
| L6A2 | | 4.036 | 0.078 | | | | |
| L7A1 | 7th lens element | 6.397 | 0.782 | 1.545 | 55.987 | 6.563 | Plastic |
| L7A2 | | -7.803 | 0.430 | | | | |
| L8A1 | 8th lens element | -24.768 | 0.782 | 1.545 | 55.987 | -4.482 | Plastic |
| L8A2 | | 2.748 | 0.587 | | | | |
| TFA1 | Filtering unit | INFINITY | 0.210 | 1.517 | 64.167 | | |
| TFA2 | | INFINITY | 0.376 | | | | |
| IMA | Image plane | INFINITY | | | | | |

FIG. 32

| Embodiment 7 | | | | | |
|---|---|---|---|---|---|
| Aspherical Parameters | | | | | |
| Surface# | K | $a_4$ | $a_6$ | $a_8$ | $a_{10}$ |
| L1A1 | 9.721422E-02 | 1.882503E-03 | -1.538766E-03 | 1.288074E-03 | -3.712683E-04 |
| L1A2 | 0.000000E+00 | -1.304848E-02 | 5.943148E-03 | 2.407359E-03 | -3.534165E-03 |
| L2A1 | 0.000000E+00 | -2.817059E-02 | 1.938604E-02 | -2.647130E-03 | -2.729709E-03 |
| L2A2 | 6.951441E+00 | -2.563745E-02 | 1.848206E-02 | -1.138020E-02 | 6.423397E-03 |
| L3A1 | 0.000000E+00 | -6.638976E-03 | -1.686964E-02 | 1.910345E-02 | -1.527361E-02 |
| L3A2 | 0.000000E+00 | -3.913190E-03 | -1.707213E-02 | 1.479031E-02 | -1.041722E-02 |
| L4A1 | 0.000000E+00 | 9.701462E-03 | -7.726971E-02 | 6.672210E-02 | -2.937167E-02 |
| L4A2 | 0.000000E+00 | 1.103945E-01 | -2.756158E-01 | 3.498207E-01 | -2.969092E-01 |
| L5A1 | 0.000000E+00 | 1.646754E-01 | -3.023433E-01 | 3.495476E-01 | -2.694354E-01 |
| L5A2 | 0.000000E+00 | 3.911934E-02 | -1.034855E-01 | 1.048192E-01 | -6.944108E-02 |
| L6A1 | 0.000000E+00 | -2.625741E-02 | -1.208366E-02 | 1.012247E-02 | -5.130390E-03 |
| L6A2 | 0.000000E+00 | -3.990739E-02 | -4.077776E-03 | 6.808862E-03 | -3.650459E-03 |
| L7A1 | 0.000000E+00 | -1.845177E-02 | -2.798319E-03 | 2.508816E-03 | -9.868325E-04 |
| L7A2 | 2.955834E+00 | 3.907410E-02 | -8.921771E-03 | 8.652504E-04 | -1.405427E-06 |
| L8A1 | 1.884190E+01 | -2.528081E-02 | 5.011811E-03 | -6.039387E-04 | 6.320835E-05 |
| L8A2 | -6.786318E+00 | -2.120914E-02 | 3.874839E-03 | -5.387570E-04 | 4.706223E-05 |
| Surface# | $a_{12}$ | $a_{14}$ | $a_{16}$ | $a_{18}$ | $a_{20}$ |
| L1A1 | 4.502431E-06 | 2.394700E-05 | -4.255828E-06 | | |
| L1A2 | 1.573724E-03 | -3.270730E-04 | 2.657614E-05 | | |
| L2A1 | 1.817556E-03 | -4.406110E-04 | 4.016354E-05 | | |
| L2A2 | -2.694204E-03 | 7.226026E-04 | -8.352133E-05 | | |
| L3A1 | 7.246185E-03 | -1.752123E-03 | 1.715733E-04 | | |
| L3A2 | 4.483800E-03 | -9.525632E-04 | 7.300899E-05 | | |
| L4A1 | -6.251590E-03 | 1.468240E-02 | -7.318678E-03 | 1.630206E-03 | -1.411975E-04 |
| L4A2 | 1.662807E-01 | -6.033331E-02 | 1.364932E-02 | -1.755375E-03 | 9.845849E-05 |
| L5A1 | 1.382031E-01 | -4.624438E-02 | 9.637955E-03 | -1.131997E-03 | 5.705341E-05 |
| L5A2 | 3.098917E-02 | -9.077728E-03 | 1.651368E-03 | -1.678746E-04 | 7.234466E-06 |
| L6A1 | 1.571025E-03 | -3.027653E-04 | 3.533041E-05 | -2.276088E-06 | 6.162656E-08 |
| L6A2 | 1.106115E-03 | -1.991601E-04 | 2.101042E-05 | -1.198324E-06 | 2.859203E-08 |
| L7A1 | 2.398742E-04 | -3.655115E-05 | 3.288678E-06 | -1.604005E-07 | 3.205194E-09 |
| L7A2 | -1.018003E-05 | 1.282036E-06 | -7.700755E-08 | 2.395770E-09 | -3.164200E-11 |
| L8A1 | -5.346099E-06 | 3.099500E-07 | -1.110609E-08 | 2.218480E-10 | -1.957000E-12 |
| L8A2 | -2.261786E-06 | 4.259682E-08 | 7.638740E-10 | -4.602900E-11 | 5.480000E-13 |

FIG. 33

| Embodiment 8 | | | | | | | |
|---|---|---|---|---|---|---|---|
| EFL = 7.681 mm ; HFOV = 35.430 degrees ; TTL = 9.014 mm | | | | | | | |
| Fno = 1.649 ; Image Height = 5.800 mm | | | | | | | |
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -1.120 | | | | |
| L1A1 | 1st lens element | 2.849 | 1.297 | 1.545 | 55.987 | 5.941 | Plastic |
| L1A2 | | 19.598 | 0.156 | | | | |
| L2A1 | 2nd lens element | 18.940 | 0.200 | 1.671 | 19.243 | -12.776 | Plastic |
| L2A2 | | 5.916 | 0.444 | | | | |
| L3A1 | 3rd lens element | 8.291 | 0.363 | 1.545 | 55.987 | 41.132 | Plastic |
| L3A2 | | 12.936 | 0.652 | | | | |
| L4A1 | 4th lens element | -14.360 | 0.354 | 1.671 | 19.243 | 31.543 | Plastic |
| L4A2 | | -8.674 | 0.138 | | | | |
| L5A1 | 5th lens element | -5.237 | 0.464 | 1.545 | 55.987 | -11.558 | Plastic |
| L5A2 | | -31.646 | 0.402 | | | | |
| L6A1 | 6th lens element | 8.510 | 0.508 | 1.545 | 55.987 | 38.956 | Plastic |
| L6A2 | | 13.881 | 0.370 | | | | |
| L7A1 | 7th lens element | 4.584 | 1.004 | 1.545 | 55.987 | 6.107 | Plastic |
| L7A2 | | -11.309 | 0.448 | | | | |
| L8A1 | 8th lens element | -7.497 | 0.765 | 1.545 | 55.987 | -4.389 | Plastic |
| L8A2 | | 3.652 | 0.587 | | | | |
| TFA1 | Filtering unit | INFINITY | 0.210 | 1.517 | 64.167 | | |
| TFA2 | | INFINITY | 0.652 | | | | |
| IMA | Image plane | INFINITY | | | | | |

FIG. 36

| Embodiment 8 | | | | | |
|---|---|---|---|---|---|
| Aspherical Parameters | | | | | |
| Surface# | K | $a_4$ | $a_6$ | $a_8$ | $a_{10}$ |
| L1A1 | 9.889493E-02 | 8.737586E-05 | 7.329517E-05 | -1.259142E-04 | 1.022291E-04 |
| L1A2 | 0.000000E+00 | -1.091178E-02 | 8.432295E-03 | -3.778963E-03 | 1.110622E-03 |
| L2A1 | 0.000000E+00 | -3.265838E-02 | 3.328757E-02 | -1.697191E-02 | 5.799790E-03 |
| L2A2 | 6.571211E+00 | -3.037529E-02 | 3.062901E-02 | -1.718347E-02 | 7.121778E-03 |
| L3A1 | 0.000000E+00 | -1.567809E-02 | 9.646147E-04 | 9.416145E-04 | -5.277079E-04 |
| L3A2 | 0.000000E+00 | -1.267261E-02 | -1.094121E-03 | 2.383803E-05 | 8.451770E-04 |
| L4A1 | 0.000000E+00 | -3.850328E-03 | -2.372934E-02 | 1.694561E-02 | -9.838868E-03 |
| L4A2 | 0.000000E+00 | 4.456340E-02 | -7.432546E-02 | 5.665770E-02 | -3.389640E-02 |
| L5A1 | 0.000000E+00 | 6.625504E-02 | -1.003466E-01 | 7.775403E-02 | -4.494006E-02 |
| L5A2 | 0.000000E+00 | 8.453154E-03 | -3.595995E-02 | 2.590060E-02 | -1.284459E-02 |
| L6A1 | 0.000000E+00 | -1.437750E-02 | 1.857206E-03 | -1.301328E-03 | 3.547914E-04 |
| L6A2 | 0.000000E+00 | -4.508644E-02 | 1.514428E-02 | -5.855852E-03 | 1.735748E-03 |
| L7A1 | 0.000000E+00 | -2.452295E-02 | 3.022553E-03 | -2.204726E-03 | 7.750591E-04 |
| L7A2 | 8.160790E+00 | 2.776497E-02 | -1.024178E-02 | 1.383450E-03 | -2.855834E-05 |
| L8A1 | -5.306533E-01 | -1.937358E-02 | 8.499021E-04 | 6.907439E-04 | -1.515024E-04 |
| L8A2 | -1.116760E+01 | -1.875447E-02 | 3.210329E-03 | -3.625912E-04 | 3.057955E-05 |
| Surface# | $a_{12}$ | $a_{14}$ | $a_{16}$ | $a_{18}$ | $a_{20}$ |
| L1A1 | -4.519093E-05 | 9.564076E-06 | -9.076594E-07 | | |
| L1A2 | -2.149163E-04 | 2.409748E-05 | -1.220185E-06 | | |
| L2A1 | -1.240464E-03 | 1.517446E-04 | -7.916951E-06 | | |
| L2A2 | -1.919473E-03 | 3.100261E-04 | -2.067012E-05 | | |
| L3A1 | 2.782285E-04 | -6.567761E-05 | 6.261869E-06 | | |
| L3A2 | -4.486086E-04 | 1.101024E-04 | -1.194418E-05 | | |
| L4A1 | 4.128923E-03 | -1.166503E-03 | 2.273199E-04 | -3.309959E-05 | 2.583912E-06 |
| L4A2 | 1.471046E-02 | -4.216627E-03 | 7.507147E-04 | -7.697052E-05 | 3.584809E-06 |
| L5A1 | 1.842632E-02 | -4.914884E-03 | 7.827178E-04 | -6.506974E-05 | 1.995718E-06 |
| L5A2 | 4.606716E-03 | -1.146948E-03 | 1.837787E-04 | -1.674393E-05 | 6.530213E-07 |
| L6A1 | -1.300342E-05 | -1.292095E-05 | 3.055025E-06 | -2.930482E-07 | 1.064475E-08 |
| L6A2 | -3.559681E-04 | 5.244605E-05 | -5.272945E-06 | 3.111387E-07 | -7.921040E-09 |
| L7A1 | -1.580724E-04 | 2.022637E-05 | -1.598761E-06 | 7.082409E-08 | -1.325362E-09 |
| L7A2 | -2.035056E-05 | 3.402979E-06 | -2.544849E-07 | 9.210173E-09 | -1.226420E-10 |
| L8A1 | 1.585491E-05 | -9.721634E-07 | 3.550168E-08 | -7.156250E-10 | 6.134000E-12 |
| L8A2 | -1.934578E-06 | 8.667147E-08 | -2.531573E-09 | 4.271300E-11 | -3.140000E-13 |

FIG. 37

| Embodiment 9 ||||||||
|---|---|---|---|---|---|---|---|
| EFL = 7.113 mm ; HFOV = 39.492 degrees ; TTL = 8.347 mm ||||||||
| Fno = 1.649 ; Image Height = 6.700 mm ||||||||
| Surface # | | Radius of curvature (mm) | Thickness /air gap (mm) | Refractive index | Abbe number | Focal length (mm) | Material |
| OBJ | Object | INFINITY | INFINITY | | | | |
| STO | Aperture stop | INFINITY | -1.072 | | | | |
| L1A1 | 1st lens element | 2.785 | 1.156 | 1.545 | 55.987 | 6.166 | Plastic |
| L1A2 | | 13.728 | 0.050 | | | | |
| L2A1 | 2nd lens element | 7.705 | 0.343 | 1.671 | 19.243 | -13.264 | Plastic |
| L2A2 | | 4.074 | 0.237 | | | | |
| L3A1 | 3rd lens element | 7.611 | 0.372 | 1.545 | 55.987 | 40.867 | Plastic |
| L3A2 | | 11.349 | 0.500 | | | | |
| L4A1 | 4th lens element | 73.962 | 0.306 | 1.671 | 19.243 | 226.119 | Plastic |
| L4A2 | | 142.756 | 0.156 | | | | |
| L5A1 | 5th lens element | -8.931 | 0.475 | 1.545 | 55.987 | -48.134 | Plastic |
| L5A2 | | -13.778 | 0.296 | | | | |
| L6A1 | 6th lens element | 7.237 | 0.485 | 1.567 | 37.533 | 85.728 | Plastic |
| L6A2 | | 8.290 | 0.452 | | | | |
| L7A1 | 7th lens element | 9.030 | 0.808 | 1.545 | 55.987 | 6.310 | Plastic |
| L7A2 | | -5.399 | 0.726 | | | | |
| L8A1 | 8th lens element | -5.916 | 0.645 | 1.545 | 55.987 | -4.215 | Plastic |
| L8A2 | | 3.915 | 0.582 | | | | |
| TFA1 | Filtering unit | INFINITY | 0.210 | 1.517 | 64.167 | | |
| TFA2 | | INFINITY | 0.550 | | | | |
| IMA | Image plane | INFINITY | | | | | |

FIG. 40

| Embodiment 9 |||||
|---|---|---|---|---|
| Aspherical Parameters |||||
| Surface# | K | $a_4$ | $a_6$ | $a_8$ | $a_{10}$ |
| L1A1 | -2.513852E-02 | 8.153647E-04 | 5.456976E-05 | 1.691741E-04 | -1.101698E-04 |
| L1A2 | 0.000000E+00 | -1.109443E-02 | 6.958281E-03 | -1.144894E-03 | -3.465576E-04 |
| L2A1 | 0.000000E+00 | -1.700141E-02 | 5.414427E-03 | 1.873076E-03 | -2.101683E-03 |
| L2A2 | 2.188297E+00 | -9.514404E-03 | -1.322280E-03 | 1.435894E-03 | 3.514314E-04 |
| L3A1 | 0.000000E+00 | 9.004959E-04 | -2.960169E-03 | -5.969390E-04 | 2.310229E-03 |
| L3A2 | 0.000000E+00 | -1.270812E-03 | -1.767560E-03 | 8.005811E-04 | 1.103435E-04 |
| L4A1 | 0.000000E+00 | -1.152782E-02 | -3.328793E-02 | 4.400117E-02 | -4.629115E-02 |
| L4A2 | 0.000000E+00 | 1.015195E-02 | -5.279214E-02 | 5.755113E-02 | -4.861596E-02 |
| L5A1 | 0.000000E+00 | 2.792729E-02 | -5.070676E-02 | 4.461352E-02 | -2.809950E-02 |
| L5A2 | 0.000000E+00 | 1.223289E-03 | -2.958549E-02 | 2.501966E-02 | -1.524922E-02 |
| L6A1 | 0.000000E+00 | -1.263420E-02 | -1.379859E-02 | 1.355275E-02 | -7.850256E-03 |
| L6A2 | 0.000000E+00 | -2.107238E-02 | -8.533253E-03 | 9.302947E-03 | -4.597748E-03 |
| L7A1 | 0.000000E+00 | 7.031632E-04 | -1.011835E-02 | 2.536470E-03 | -1.207892E-04 |
| L7A2 | -3.001241E+01 | 9.825397E-03 | -2.960694E-03 | -1.441342E-03 | 8.327577E-04 |
| L8A1 | 0.000000E+00 | -1.715315E-02 | 4.559051E-04 | 1.595577E-04 | 2.771641E-05 |
| L8A2 | -1.481516E+01 | -1.531902E-02 | 1.971760E-03 | -1.745152E-04 | 8.909974E-06 |
| Surface# | $a_{12}$ | $a_{14}$ | $a_{16}$ | $a_{18}$ | $a_{20}$ |
| L1A1 | 4.744891E-05 | -9.670640E-06 | 8.245567E-07 | | |
| L1A2 | 2.134139E-04 | -3.987039E-05 | 2.710801E-06 | | |
| L2A1 | 7.733734E-04 | -1.333280E-04 | 9.014229E-06 | | |
| L2A2 | -7.899267E-04 | 3.407653E-04 | -4.593499E-05 | | |
| L3A1 | -1.493241E-03 | 4.935406E-04 | -5.995367E-05 | | |
| L3A2 | -2.307034E-05 | 1.754793E-05 | -1.659337E-06 | | |
| L4A1 | 3.212309E-02 | -1.447348E-02 | 4.041264E-03 | -6.320857E-04 | 4.239225E-05 |
| L4A2 | 2.775640E-02 | -1.046024E-02 | 2.520494E-03 | -3.511209E-04 | 2.148048E-05 |
| L5A1 | 1.134620E-02 | -2.682270E-03 | 3.510534E-04 | -2.274053E-05 | 5.291152E-07 |
| L5A2 | 6.509690E-03 | -1.806788E-03 | 3.136643E-04 | -3.109465E-05 | 1.338632E-06 |
| L6A1 | 2.682869E-03 | -5.418097E-04 | 6.436870E-05 | -4.203456E-06 | 1.173771E-07 |
| L6A2 | 1.287442E-03 | -2.103194E-04 | 1.997975E-05 | -1.032049E-06 | 2.263424E-08 |
| L7A1 | -1.180140E-04 | 3.877179E-05 | -5.773593E-06 | 4.275682E-07 | -1.250246E-08 |
| L7A2 | -1.798745E-04 | 2.089037E-05 | -1.372958E-06 | 4.813762E-08 | -7.009530E-10 |
| L8A1 | -8.393127E-06 | 7.857367E-07 | -3.676676E-08 | 8.793140E-10 | -8.588000E-12 |
| L8A2 | -2.262609E-07 | 7.695820E-10 | 8.115800E-11 | -4.750000E-13 | -2.400000E-14 |

FIG. 41

| Embodiment | 1st | 2nd | 3rd | 4th | 5th |
|---|---|---|---|---|---|
| V5+V6 | 111.974 | 111.974 | 111.974 | 111.974 | 111.974 |
| V5+V6+V7 | 167.961 | 167.961 | 167.961 | 167.961 | 161.896 |
| ImgH/(T3+T4) | 7.514 | 10.656 | 10.186 | 9.536 | 8.857 |
| AAG/BFL | 2.804 | 1.801 | 3.428 | 1.801 | 1.801 |
| TTL/(T2+G45+G67) | 7.932 | 8.348 | 9.539 | 7.201 | 11.225 |
| TL/T1 | 11.089 | 8.864 | 12.968 | 6.005 | 5.721 |
| (T1+T2+T3+T4)/D78 | 0.995 | 0.590 | 0.542 | 0.999 | 0.999 |
| (T5+T8)/G34 | 1.339 | 2.271 | 2.577 | 5.598 | 1.792 |
| ImgH/(T5+G56) | 6.714 | 9.418 | 8.154 | 8.360 | 7.491 |
| EFL/BFL | 5.310 | 5.301 | 6.302 | 5.301 | 5.300 |
| TTL/T8 | 17.990 | 17.999 | 8.570 | 7.142 | 15.797 |
| (G67+T7+G78)/T1 | 3.074 | 3.834 | 4.099 | 1.324 | 1.683 |
| D25/(T1+G12) | 4.972 | 2.609 | 3.238 | 2.068 | 1.777 |
| ALT/AAG | 1.194 | 1.899 | 1.377 | 1.899 | 1.899 |
| ImgH/(T2+G45) | 15.499 | 22.538 | 20.339 | 10.275 | 19.885 |
| (EFL+BFL)/(T5+G56) | 7.065 | 11.399 | 7.480 | 10.795 | 10.225 |
| TL/(G12+T4) | 20.823 | 23.336 | 15.985 | 17.781 | 18.929 |
| (G34+T5)/T6 | 4.988 | 4.795 | 1.637 | 2.956 | 2.218 |
| (T4+G67)/G23 | 3.275 | 4.197 | 4.499 | 2.122 | 2.400 |
| (EFL+ImgH)/ALT | 3.377 | 3.072 | 3.021 | 2.977 | 2.899 |
| (V6+V7)−(V2+V4) | 73.488 | 73.488 | 73.488 | 73.488 | 67.424 |
| (V7+V8)−(V4+V6) | 36.744 | 36.744 | 36.744 | 36.744 | 30.680 |
| \|V6−V7\| | 0.000 | 0.000 | 0.000 | 0.000 | 6.065 |
| V6−V2 | 36.744 | 36.744 | 36.744 | 36.744 | 36.744 |
| V7−V4 | 36.744 | 36.744 | 36.744 | 36.744 | 30.680 |

FIG. 42

| Embodiment | 6th | 7th | 8th | 9th |
|---|---|---|---|---|
| V5+V6 | 111.974 | 111.974 | 111.974 | 93.520 |
| V5+V6+V7 | 167.961 | 167.961 | 167.961 | 149.507 |
| ImgH/(T3+T4) | 7.517 | 7.506 | 8.084 | 9.889 |
| AAG/BFL | 1.801 | 1.942 | 1.801 | 1.801 |
| TTL/(T2+G45+G67) | 11.950 | 11.870 | 12.723 | 8.772 |
| TL/T1 | 5.799 | 6.696 | 5.832 | 6.062 |
| (T1+T2+T3+T4)/D78 | 0.999 | 0.991 | 0.999 | 0.999 |
| (T5+T8)/G34 | 1.895 | 2.079 | 1.885 | 2.241 |
| ImgH/(T5+G56) | 6.701 | 6.728 | 6.701 | 8.694 |
| EFL/BFL | 5.301 | 5.310 | 5.301 | 5.301 |
| TTL/T8 | 10.711 | 9.921 | 11.788 | 12.934 |
| (G67+T7+G78)/T1 | 1.392 | 1.312 | 1.405 | 1.718 |
| D25/(T1+G12) | 1.712 | 2.503 | 1.800 | 1.980 |
| ALT/AAG | 1.899 | 1.891 | 1.899 | 1.899 |
| ImgH/(T2+G45) | 15.969 | 10.075 | 17.145 | 13.424 |
| (EFL+BFL)/(T5+G56) | 10.771 | 8.587 | 10.548 | 10.971 |
| TL/(G12+T4) | 13.001 | 15.378 | 14.837 | 19.684 |
| (G34+T5)/T6 | 2.476 | 3.571 | 2.194 | 2.011 |
| (T4+G67)/G23 | 2.131 | 1.282 | 1.633 | 3.202 |
| (EFL+ImgH)/ALT | 2.696 | 2.792 | 2.720 | 3.010 |
| (V6+V7)-(V2+V4) | 73.488 | 73.488 | 73.488 | 55.034 |
| (V7+V8)-(V4+V6) | 36.744 | 36.744 | 36.744 | 55.198 |
| |V6-V7| | 0.000 | 0.000 | 0.000 | 18.454 |
| V6-V2 | 36.744 | 36.744 | 36.744 | 18.290 |
| V7-V4 | 36.744 | 36.744 | 36.744 | 36.744 |

FIG. 43

OPTICAL IMAGING LENS

CROSS-REFERENCE TO RELATED APPLICATIONS

This application claims priority to P.R.C. Patent Application No. 202011425841.9 titled "Optical Imaging Lens," filed on Dec. 9, 2020, with the State Intellectual Property Office (SIPO) of the People's Republic of China.

TECHNICAL FIELD

The present disclosure relates to optical imaging lenses, and particularly, optical imaging lenses of portable electronic devices.

BACKGROUND

Recently, application of optical imaging lenses expands along with the continuous evolvement of the optical imaging lenses. Slim and compact appearance, small Fno for increasing luminous flux, and great field of view are the trends in the industry. To provide for great pixels and high resolution, an imaging height must be increased to adopt an image sensor with great sizes receiving imaging rays. Therefore, how to design an optical imaging lens with slim and compact appearance, small Fno, great field of view, great imaging height and good imaging quality is a key topic to research.

SUMMARY

The present disclosure provides for optical imaging lenses shortening system length, decreasing f-number and enlarging image height in view of achieving good imaging quality.

In an example embodiment, an optical imaging lens may comprise eight lens elements, hereinafter referred to as first, second, third, fourth, fifth, sixth, seventh and eighth lens element and positioned sequentially from an object side to an image side along an optical axis. Each of the first, second, third, fourth, fifth, sixth, seventh and eighth lens element may also have an object-side surface facing toward the object side and allowing imaging rays to pass through and an image-side surface facing toward the image side and allowing the imaging rays to pass through.

In the specification, parameters used here are defined as follows. A thickness of the first lens element along the optical axis is represented by T1. A distance from the image-side surface of the first lens element to the object-side surface of the second lens element along the optical axis, i.e. an air gap between the first lens element and the second lens element along the optical axis, is represented by G12. A thickness of the second lens element along the optical axis is represented by T2. A distance from the image-side surface of the second lens element to the object-side surface of the third lens element along the optical axis, i.e. an air gap between the second lens element and the third lens element along the optical axis, is represented by G23. A thickness of the third lens element along the optical axis is represented by T3. A distance from the image-side surface of the third lens element to the object-side surface of the fourth lens element along the optical axis, i.e. an air gap between the third lens element and the fourth lens element along the optical axis, is represented by G34. A thickness of the fourth lens element along the optical axis is represented by T4. A distance from the image-side surface of the fourth lens element to the object-side surface of the fifth lens element along the optical axis, i.e. an air gap between the fourth lens element and the fifth lens element along the optical axis, is represented by G45. A thickness of the fifth lens element along the optical axis is represented by T5. A distance from the image-side surface of the fifth lens element to the object-side surface of the sixth lens element along the optical axis, i.e. an air gap between the fifth lens element and the sixth lens element along the optical axis, is represented by G56. A thickness of the sixth lens element along the optical axis is represented by T6. A distance from the image-side surface of the sixth lens element to the object-side surface of the seventh lens element along the optical axis, i.e. an air gap between the sixth lens element and the seventh lens element along the optical axis, is represented by G67. A thickness of the seventh lens element along the optical axis is represented by T7. A distance from the image-side surface of the seventh lens element to the object-side surface of the eighth lens element along the optical axis, i.e. an air gap between the seventh lens element and the eighth lens element along the optical axis, is represented by G78. A thickness of the eighth lens element along the optical axis is represented by T8. A distance from the image-side surface of the eighth lens element to an object-side surface of a filtering unit along the optical axis is represented by G8F. A thickness of the filtering unit along the optical axis is represented by TTF. A distance from the image-side surface of the filtering unit to the image plane along the optical axis is represented by GFP. A focal length of the first lens element is represented by f1. A focal length of the second lens element is represented by f2. A focal length of the third lens element is represented by f3. A focal length of the fourth lens element is represented by f4. A focal length of the fifth lens element is represented by f5. A focal length of the sixth lens element is represented by f6. A focal length of the seventh lens element is represented by f7. A focal length of the eighth lens element is represented by f8. A refractive index of the first lens element is represented by n1. A refractive index of the second lens element is represented by n2. A refractive index of the third lens element is represented by n3. A refractive index of the fourth lens element is represented by n4. A refractive index of the fifth lens element is represented by n5. A refractive index of the sixth lens element is represented by n6. A refractive index of the seventh lens element is represented by n7. A refractive index of the eighth lens element is represented by n8. An abbe number of the first lens element is represented by V1. An abbe number of the second lens element is represented by V2. An abbe number of the third lens element is represented by V3. An abbe number of the fourth lens element is represented by V4. An abbe number of the fifth lens element is represented by V5. An abbe number of the sixth lens element is represented by V6. An abbe number of the seventh lens element is represented by V7. An abbe number of the eighth lens element is represented by V8. An effective focal length of the optical imaging lens is represented by EFL. A distance from the object-side surface of the first lens element to the image-side surface of the eighth lens element along the optical axis is represented by TL. A distance from the object-side surface of the first lens element to the image plane along the optical axis, i.e. a system length, is represented by TTL. A sum of the thicknesses of all eight lens elements from the first lens element to the eighth lens element along the optical axis, i.e. a sum of T1, T2, T3, T4, T5, T6, T7 and T8, is represented by ALT. A sum of seven air gaps from the first lens element to the eighth lens element along the optical axis, i.e. a sum of G12, G23, G34, G45, G56, G67 and G78, is represented by AAG. A distance from the image-side surface of the eighth lens element to the image plane along the optical axis i.e. a sum of G8F, TTF and GFP, is represented by BFL. A half field of view of the optical imaging lens is represented by HFOV. An image height of the optical imaging lens is represented by ImgH. A f-number of the optical imaging lens is represented by Fno. A distance from the object-side surface of the second lens element to the image-side surface of the fifth lens element along the optical axis, i.e. a sum of T2, G23, T3, G34, T4, G45 and T5, is represented by D25. A distance from the object-side surface of the seventh lens element to the image-side surface of the eighth lens element along the optical axis, i.e. a sum of T7, G78 and T8, is represented by D78.

In an aspect of the present disclosure, in the optical imaging lens, the first lens element has positive refracting power, the fifth lens element has negative refracting power, and an optical axis region of the image-side surface of the fifth lens element is convex, and the sixth lens element has positive refracting power. Lens elements included by the optical imaging lens are only the eight lens elements described above, and the optical imaging lens satisfies the inequalities:

$V5+V6+V7 \geq 155.000$     Inequality (1).

In another aspect of the present disclosure, in the optical imaging lens, the first lens element has positive refracting power, a periphery region of the object-side surface of the second lens element is convex, the fifth lens element has negative refracting power, the sixth lens element has positive refracting power, and an optical axis region of the object-side surface of the seventh lens element is convex. Lens elements included by the optical imaging lens are only the eight lens elements described above, and the optical imaging lens satisfies Inequality (1).

In another aspect of the present disclosure, in the optical imaging lens, the third lens element has positive refracting power, the fifth lens element has negative refracting power, the sixth lens element has positive refracting power, and an optical axis region of the image-side surface of the sixth lens element is concave, and an optical axis region of the object-side surface of the seventh lens element is convex. Lens elements included by the optical imaging lens are only the eight lens elements described above, and the optical imaging lens satisfies:

$V5+V6 \geq 85.000$     Inequality (2).

In another example embodiment, other inequality(s), such as those relating to the ratio among parameters could be taken into consideration. For example:

$ImgH/(T3+T4) \geq 7.500$     Inequality (3);

$AAG/BFL \geq 1.800$     Inequality (4);

$TTL/(T2+G45+G67) \geq 7.200$     Inequality (5);

$TL/T1 \leq 13.000$     Inequality (6);

$(T1+T2+T3+T4)/D78 \leq 1.000$     Inequality (7);

$(T5+T8)/G34 \leq 5.600$     Inequality (8);

$ImgH/(T5+G56) \geq 6.700$     Inequality (9);

$EFL/BFL \geq 5.300$     Inequality (10);

$TTL/T8 \leq 18.000$     Inequality (11);

$(G67+T7+G78)/T1 \leq 4.100$     Inequality (12);

$D25/(T1+G12) \leq 5.000$     Inequality (13);

$ALT/AAG \leq 1.900$     Inequality (14);

$ImgH/(T2+G45) \geq 10.000$     Inequality (15);

$(EFL+BFL)/(T5+G56) \leq 11.400$     Inequality (16);

$TL/(G12+T4) \geq 13.000$     Inequality (17);

$(G34+T5)/T6 \geq 1.500$     Inequality (18);

$(T4+G67)/G23 \leq 4.500$     Inequality (19);

$(EFL+ImgH)/ALT \geq 2.600$     Inequality (20);

$(V6+V7)-(V2+V4) \geq 30.000$     Inequality (21);

$(V7+V8)-(V4+V6) \geq 20.000$     Inequality (22);

$|V6-V7| \geq 20.000$     Inequality (23);

$V6-V2 \geq 10.000$     Inequality (24); and/or $V7-V4 \geq 20.000$     Inequality (25).

In some example embodiments, more details about the convex or concave surface structure, refracting power or chosen material etc. could be incorporated for one specific lens element or broadly for a plurality of lens elements to improve the control for the system performance and/or resolution. It is noted that the details listed herein could be incorporated in example embodiments if no inconsistency occurs.

The optical imaging lens in example embodiments may shorten system length, decrease f-number and increase image height in view of achieving good imaging quality.

BRIEF DESCRIPTION OF THE DRAWINGS

Example embodiments will be more readily understood from the following detailed description when read in conjunction with the appended drawing, in which:

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of an eighth embodiment of an optical imaging lens according to the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIGS. 42 and 43 depict a table for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of all nine example embodiments.

DETAILED DESCRIPTION

For a more complete understanding of the present disclosure and its advantages, reference is now made to the following description taken in conjunction with the accompanying drawings, in which like reference numbers indicate like features. Persons of ordinary skill in the art having the benefit of the present disclosure will understand other variations for implementing embodiments within the scope of the present disclosure, including those specific examples described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

The terms "optical axis region", "periphery region", "concave", and "convex" used in this specification and claims should be interpreted based on the definition listed in the specification by the principle of lexicographer.

Figures 1, 2:
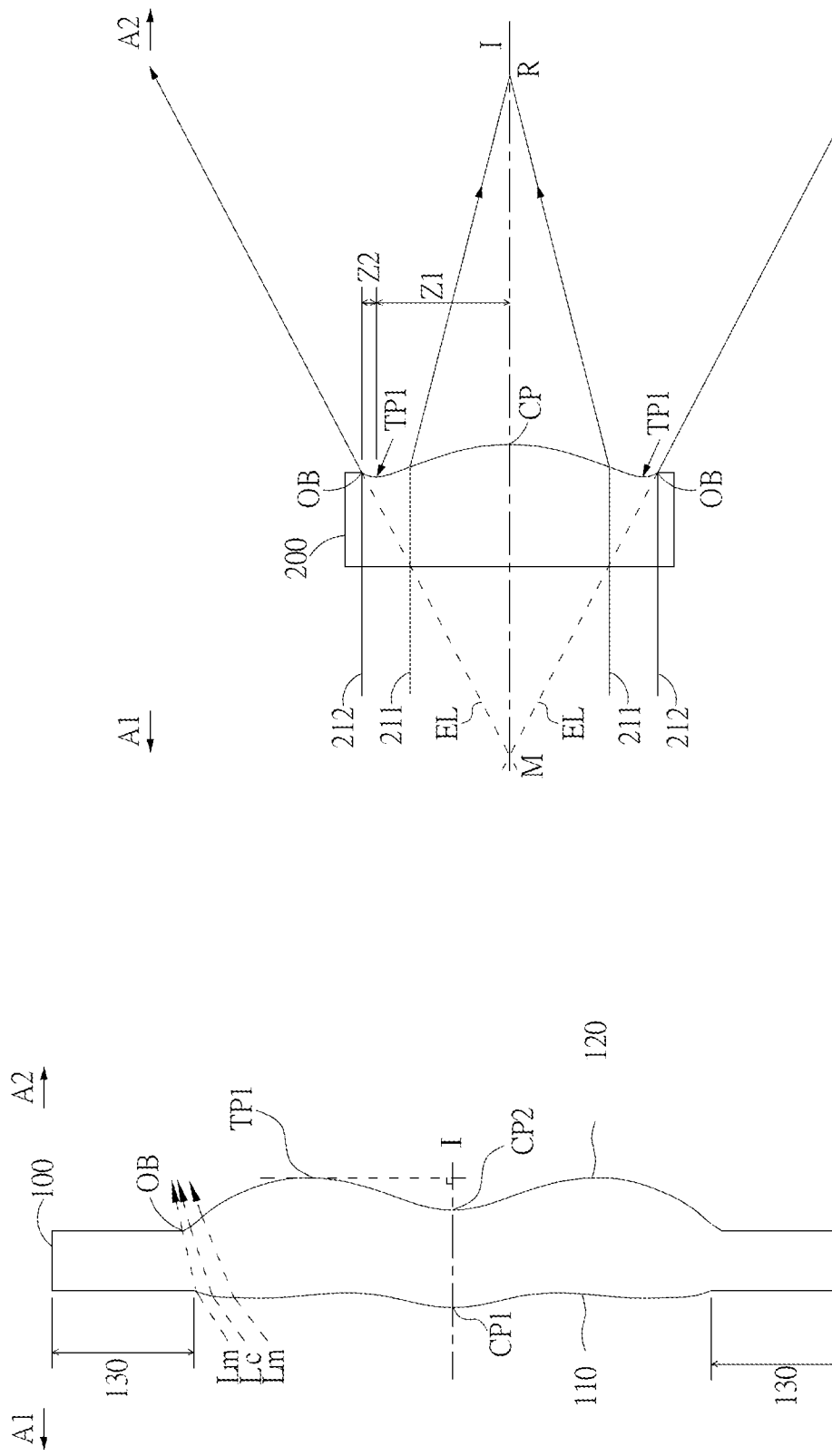
FIG. 1 depicts a cross-sectional view of one single lens element according to the present disclosure.
FIG. 2 depicts a cross-sectional view showing the relation between the shape of a portion and the position where a collimated ray meets the optical axis.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
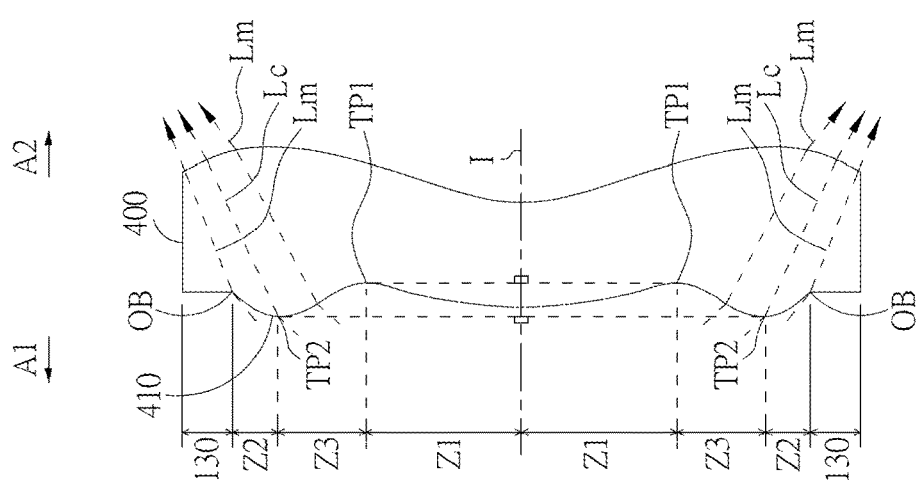
FIG. 4 depicts a cross-sectional view showing a second example of determining the shape of lens element regions and the boundaries of regions.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex-(concave-) region," can be used alternatively.

Figure 5:
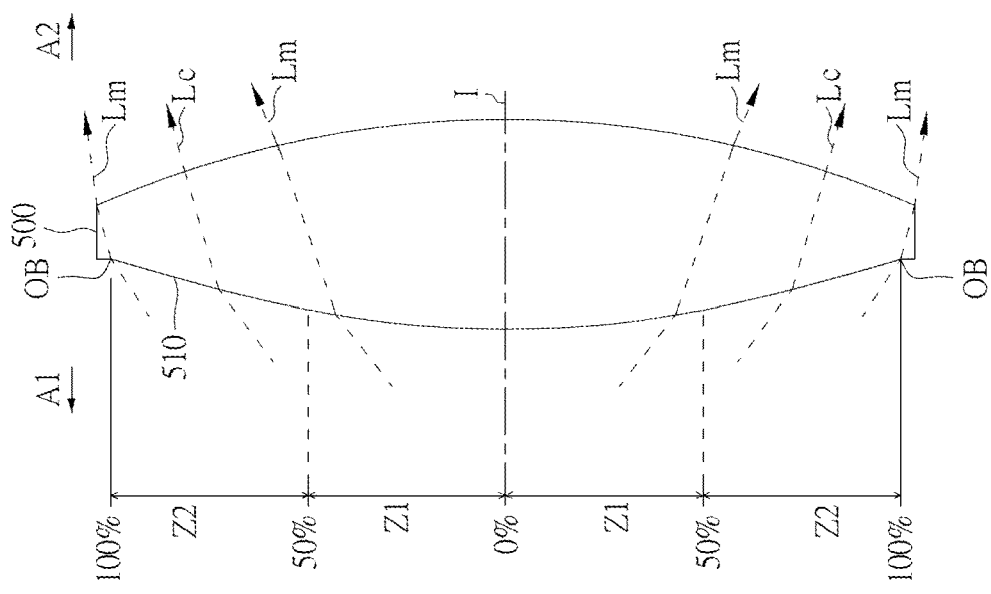
FIG. 5 depicts a cross-sectional view showing a third example of determining the shape of lens element regions and the boundaries of regions.
Figure 3:
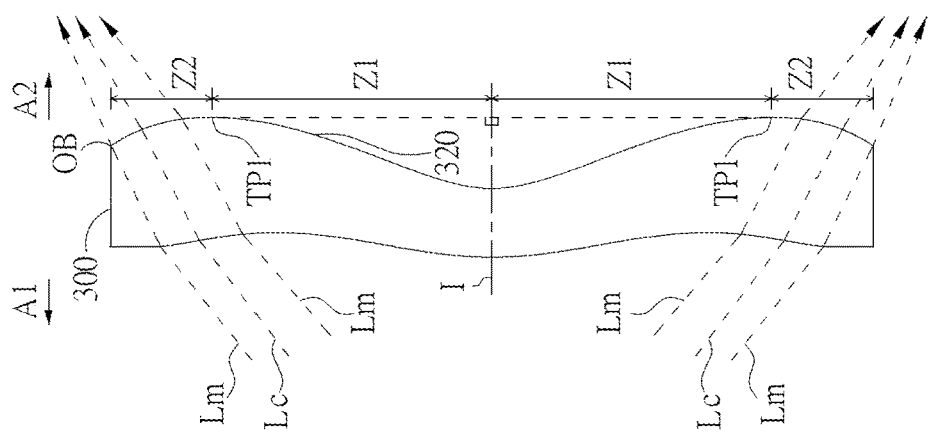
FIG. 3 depicts a cross-sectional view showing a first example of determining the shape of lens element regions and the boundaries of regions.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

In the present disclosure, examples of an optical imaging lens are provided. Example embodiments of an optical imaging lens may comprise a first lens element, a second lens element, a third lens element, a fourth lens element, a fifth lens element, a sixth lens element, a seventh lens element and an eighth lens element arranged sequentially from the object side to the image side along an optical axis. Each of the lens elements may comprise an object-side surface facing toward an object side allowing imaging rays to pass through and an image-side surface facing toward an image side allowing the imaging rays to pass through. Through controlling shape of the surfaces and range of the parameters, the optical imaging lens in example embodiments may shorten system length, decrease f-number and increase image height of the optical imaging lens in view of achieving good imaging quality.

In some embodiments, the lens elements are designed with convex/concave surface shape and refracting power of lens elements in light of the optical characteristics and system length. For example, when an optical imaging lens satisfies conditions that the first lens element has positive refracting power, the fifth lens element has negative refracting power, the sixth lens element has positive refracting power, and V5+V6+V7≥155.000, accompanied with one of the combinations below: (a) an optical axis region of the image-side surface of the fifth lens element is convex; (b) a periphery region of the object-side surface of the second lens element is convex, and an optical axis region of the object-side surface of the seventh lens element is convex, it will be beneficial to increase luminous flux, increase image height and improve chromatic aberration to provide good imaging quality.

When an optical imaging lens satisfies the conditions that the third lens element has positive refracting power, the fifth lens element has negative refracting power, the sixth lens element has positive refracting power, an optical axis region of the image-side surface of the sixth lens element is concave, and an optical axis region of the object-side surface of the seventh lens element is convex, it will be beneficial to increase luminous flux, increase image height and provide good imaging quality. When the optical imaging lens further satisfies V5+V6≥85.000, it will be beneficial to adjust chromatic aberration and other aberrations. Preferably, the optical imaging lens further satisfies 85.000≤V5+V6≤125.000.

In an optical imaging lens, when the fifth, sixth or seventh lens element is made by plastic materials, the shape of aspherical surface will be formed well. Under such circumstances, better manufacturing yield may be shown even when the surface shapes of an optical axis region and a periphery region are different.

When the material of the lens elements satisfies the condition that the abbe number of the fifth and eighth are of the same value, (V6+V7)−(V2+V4)≥30.000, (V7+V8)−(V4+V6)≥20.000, |V6−V7|≤20.000, V6−V2≥10.000 or V7−V4≥20.000, it will be beneficial to transmit and deflect imaging rays and eliminate chromatic aberration effectively to provide good imaging quality. Preferably, the optical imaging lens further satisfies 30.000≤(V6+V7)−(V2+V4)≤75.000, 20.000≤(V7+V8)−(V4+V6)≤60.000, 0.000≤|V6−V7|≤20.000, 10.000 V6−V2≤40.000, 20.000≤V7−V4≤40.000.

When the image height (ImgH) of the optical imaging lens satisfies the condition that ImgH/(T3+T4)≥7.500, ImgH/(T5+G56)≥6.700, ImgH/(T2+G45)≥10.000 or (EFL+ImgH)/ALT≥22.600, the image height may be increased, and the pixels and resolution may be raised. Preferably, the optical imaging lens further satisfies 7.500≤ImgH/(T3+T4)≤11.700, 6.700≤ImgH/(T5+G56)≤10.300, 10.000≤ImgH/(T2+G45)≤24.800, 2.600≤(EFL+ImgH)/ALT≤3.700.

When the optical imaging lens further satisfies at least one of the inequalities listed below, the thickness of each lens element and air gap between lens elements may be sustained proper values to avoid any excessive value which may be unfavorable to shorten system length and any insufficient value which may increase the production or assembly difficulty:

$AAG/BFL≥21.800$, and preferably, $1.800≤AAG/BFL≤3.700$;

$TTL/(T2+G45+G67)≥7.200$, and preferably, $7.200≤TTL/(T2+G45+G67)≤14.000$;

$TL/T1≤13.000$, and preferably, $5.200≤TL/T1≤13.000$;

$(T1+T2+T3+T4)/D78≤1.000$, and preferably, $0.500≤(T1+T2+T3+T4)/D78≤1.000$;

$(T5+T8)/G34≤5.600$, and preferably, $1.200≤(T5+T8)/G34≤5.600$;

$EFL/BFL≥5.300$, and preferably, $5.300≤EFL/BFL≤6.900$;

$TTL/T8≤18.000$, and preferably, $6.400≤TTL/T8≤18.000$;

$(G67+T7+G78)/T1≤4.100$, and preferably, $1.200 (G67+T7+G78)/T1≤4.100$;

$D25/(T1+G12)≤5.000$, and preferably, $1.500≤D25/(T1+G12)≤5.000$;

$ALT/AAG≤1.900$, and preferably, $1.000≤ALT/AAG≤1.900$;

$(EFL+BFL)/(T5+G56)≤11.400$, and preferably, $6.400≤(EFL+BFL)/(T5+G56)≤11.400$;

$TL/(G12+T4)≥13.000$, and preferably, $13.000≤TL/(G12+T4)≤25.600$;

$(G34+T5)/T6≥1.500$, and preferably, $1.500≤(G34+T5)/T6≤5.500$;

$(T4+G67)/G23≤4.500$, and preferably, $1.100≤(T4+G67)/G23≤4.500$.

In light of the unpredictability in an optical system, satisfying these inequalities listed above may result in promoting the imaging quality, shortening the system length of the optical imaging lens, lowering the f-number, enlarging half field of view and/or increasing the yield in the assembly process in the present disclosure.

When implementing example embodiments, more details about the convex or concave surface or refracting power could be incorporated for one specific lens element or broadly for a plurality of lens elements to improve the control for the system volume, performance, resolution, and/or promote the yield. For example, in an example embodiment, each lens element may be made from plastic to lighten the weight and lower the cost, and other transparent materials, such as glass, resin, etc. may be used too. It is noted that the details listed here could be incorporated in example embodiments if no inconsistency occurs.

Figure 6:
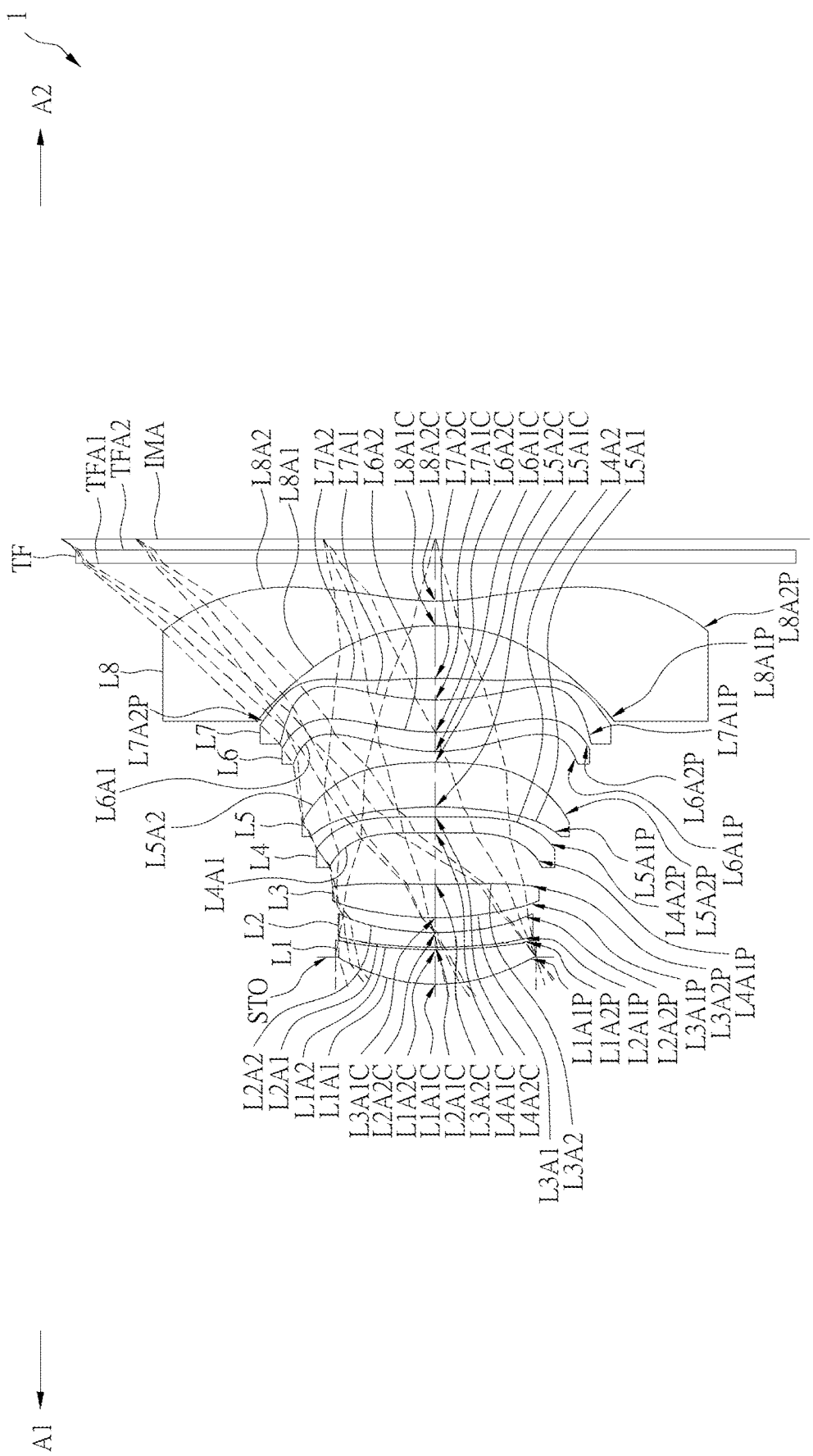
FIG. 6 depicts a cross-sectional view of a first embodiment of an optical imaging lens having eight lens elements according to the present disclosure.

Several example embodiments and associated optical data will now be provided for illustrating example embodiments of an optical imaging lens with good optical characteristics, a wide field of view and/or a low f-number. Reference is now made to FIGS. 6-9. FIG. 6 illustrates an example cross-sectional view of an optical imaging lens 1 having eight lens elements of the optical imaging lens according to a first example embodiment. FIGS. 7A-7D show example charts of a longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in the order from an object side A1 to an image side A2 along an optical axis, an aperture stop STO, a first lens element L1, a second lens element L2, a third lens element L3, a fourth lens element L4, a fifth lens element L5, a sixth lens element L6, a seventh lens element L7 and an eighth lens element L8. A filtering unit TF and an image plane IMA of an image sensor may be positioned at the image side A2 of the optical lens 1. The filtering unit TF, positioned between the eighth lens element L8 and the image plane IMA, may selectively absorb light with specific wavelength(s) from the light passing through optical imaging lens 1. The example embodiment of the filtering unit TF which may selectively absorb light with specific wavelength(s) from the light passing through optical imaging lens 1 may be an IR cut filter (infrared cut filter). Then, IR light may be absorbed, and this may prohibit the IR light, which might not be seen by human eyes, from producing an image on the image plane IMA.

Example embodiments of each lens element of the optical imaging lens 1, which may be constructed by glass, plastic, resin material or other transparent material and is constructed by plastic material here for example, will now be described with reference to the drawings.

An example embodiment of the first lens element L1 may have positive refracting power, an object-side surface L1A1 facing an object-side A1 and an image-side surface L1A2 facing an image-side A2. On the object-side surface L1A1, an optical axis region L1A1C may be convex and a periphery region L1A1P may be convex. On the image-side surface L1A2, an optical axis region L1A2C may be concave and a periphery region L1A2P may be concave.

An example embodiment of the second lens element L2 may have negative refracting power, an object-side surface L2A1 facing the object-side A1 and an image-side surface L2A2 facing the image-side A2. On the object-side surface L2A1, an optical axis region L2A1C may be convex and a periphery region L2A1P may be convex. On the image-side surface L2A2, an optical axis region L2A2C may be concave and a periphery region L2A2P may be concave.

An example embodiment of the third lens element L3 may have positive refracting power, an object-side surface L3A1 facing the object-side A1 and an image-side surface L3A2 facing the image-side A2. On the object-side surface L3A1, an optical axis region L3A1C may be convex and a periphery region L3A1P may be convex. On the image-side surface L3A2, an optical axis region L3A2C may be concave and a periphery region L3A2P may be convex.

An example embodiment of the fourth lens element L4 may have positive refracting power, an object-side surface L4A1 facing the object-side A1 and an image-side surface L4A2 facing the image-side A2. On the object-side surface L4A1, an optical axis region L4A1C may be concave and a periphery region L4A1P may be concave. On the image-side surface L4A2, an optical axis region L4A2C may be convex and a periphery region L4A2P may be convex.

An example embodiment of the fifth lens element L5 may have negative refracting power, an object-side surface L5A1 facing the object-side A1 and an image-side surface L5A2 facing the image-side A2. On the object-side surface L5A1, an optical axis region L5A1C may be concave and a periphery region L5A1P may be concave. On the image-side surface L5A2, an optical axis region L5A2C may be convex and a periphery region L5A2P may be convex.

An example embodiment of the sixth lens element L6 may have positive refracting power, an object-side surface L6A1 facing the object-side A1 and an image-side surface L6A2 facing the image-side A2. On the object-side surface L6A1, an optical axis region L6A1C may be convex and a periphery region L6A1P may be concave. On the image-side surface L6A2, an optical axis region L6A2C may be concave and a periphery region L6A2P may be convex.

An example embodiment of the seventh lens element L7 may have positive refracting power, an object-side surface L7A1 facing the object-side A1 and an image-side surface L7A2 facing the image-side A2. On the object-side surface L7A1, an optical axis region L7A1C may be convex and a periphery region L7A1P may be concave. On the image-side surface L7A2, an optical axis region L7A2C may be convex and a periphery region L7A2P may be convex.

An example embodiment of the eighth lens element L8 may have negative refracting power, an object-side surface L8A1 facing the object-side A1 and an image-side surface L8A2 facing the image-side A2. On the object-side surface L8A1, an optical axis region L8A1C may be concave and a periphery region L8A1P may be concave. On the image-side surface L8A2, an optical axis region L8A2C may be concave and a periphery region L8A2P may be convex.

In example embodiments, air gaps may exist between each pair of adjacent lens elements, as well as between the eighth lens element L8 and the filtering unit TF, and the filtering unit TF and the image plane IMA of the image sensor. Please note, in other embodiments, any of the aforementioned air gaps may or may not exist. For example, profiles of opposite surfaces of a pair of adjacent lens elements may align with and/or attach to each other, and in such situations, the air gap might not exist.

FIG. 8 depicts the optical characteristics of each lens elements in the optical imaging lens 1 of the present embodiment. Please also refer to FIG. 42 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 corresponding to the present embodiment.

The totaled 16 aspherical surfaces, including the object-side surface L1A1 and the image-side surface L1A2 of the first lens element L1, the object-side surface L2A1 and the image-side surface L2A2 of the second lens element L2, the object-side surface L3A1 and the image-side surface L3A2 of the third lens element L3, the object-side surface L4A1 and the image-side surface L4A2 of the fourth lens element L4, the object-side surface L5A1 and the image-side surface L5A2 of the fifth lens element L5, the object-side surface L6A1 and the image-side surface L6A2 of the sixth lens element L6, the object-side surface L7A1 and the image-side surface L7A2 of the seventh lens element L7 and the object-side surface L8A1 and the image-side surface L8A2 of the eighth lens element L8 may all be defined by the following aspherical formula:

$$Z(Y) = \frac{Y^2}{R} \left/ \left( 1 + \sqrt{1 - (1+K)\frac{Y^2}{R^2}} \right) \right. + \sum_{i=1}^{n} a_i \times Y^i$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; $a_i$ represents an aspherical coefficient of $i^{th}$ level. The values of other aspherical parameters are shown in FIG. 9.

Figure 7A:
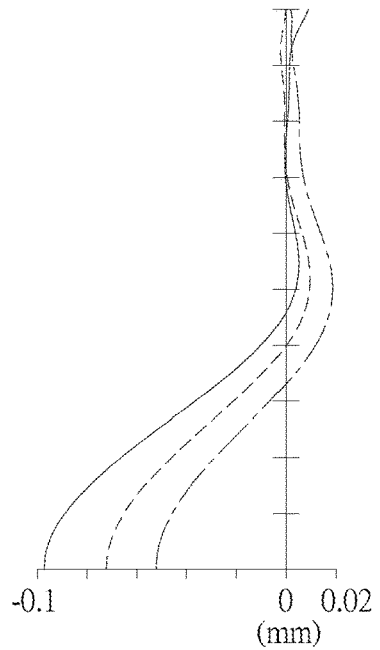
FIGS. 7A-7D depict charts of a longitudinal spherical aberration and other kinds of optical aberrations of a first embodiment of the optical imaging lens according to the present disclosure.
Figure 7B:
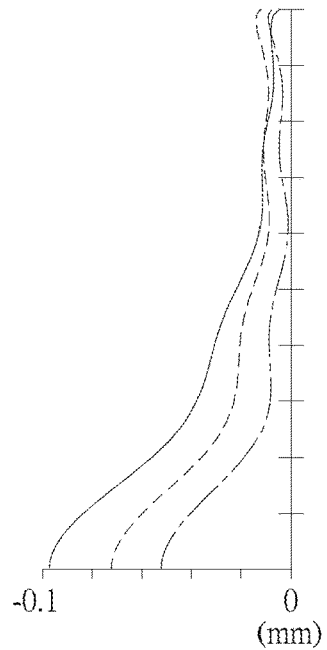
Figure 7C:
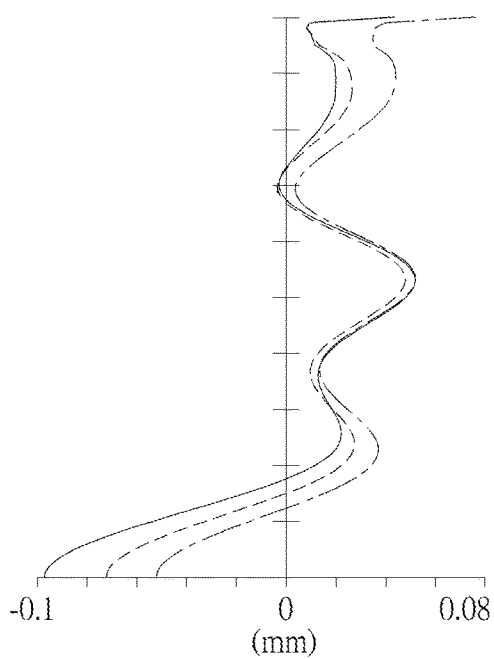
Figure 7D:
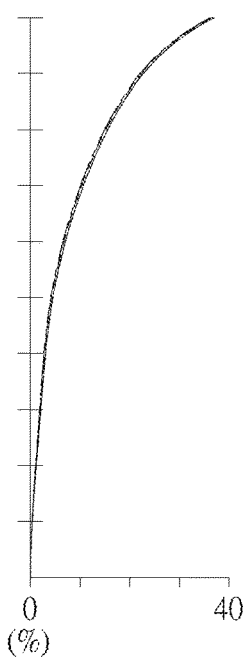

Referring to FIG. 7A, a longitudinal spherical aberration of the optical imaging lens in the present embodiment is shown in coordinates in which the horizontal axis represents the longitudinal spherical aberration and the vertical axis represents field of view, and field curvature aberration of the optical imaging lens in the present embodiment in the sagittal direction is shown in FIG. 7B, and field curvature aberration of the optical imaging lens in the present embodiment in the tangential direction is shown in FIG. 7C, in which the horizontal axis represents field curvature aberration, the vertical axis represents image height, and distortion aberration of the optical imaging lens in the present embodiment is shown in FIG. 7D, in which the horizontal axis represents percentage and the vertical axis represents image height. The curves of different wavelengths (470 nm, 555 nm, 650 nm) may be close to each other. This represents that off-axis light with respect to these wavelengths may be focused around an image point. From the vertical deviation of each curve shown therein, the offset of the off-axis light relative to the image point may be within −0.1~0.02 mm. Therefore, the present embodiment may improve the longitudinal spherical aberration with respect to different wavelengths. For field curvature aberration in the sagittal direction, the focus variation with respect to the three wavelengths in the whole field may fall within −0.1~0 mm, for field curvature aberration in the tangential direction, the focus variation with respect to the three wavelengths in the whole field may fall within −0.1~0.08 mm, and the variation of the distortion aberration may be within 0~40%.

According to the values of the aberrations, it is shown that the optical imaging lens 1 of the present embodiment, with system length as short as 6.917 mm, Fno as small as 1.649 and image height as great as 5.800 mm, may be capable of providing good imaging quality.

Figure 10:
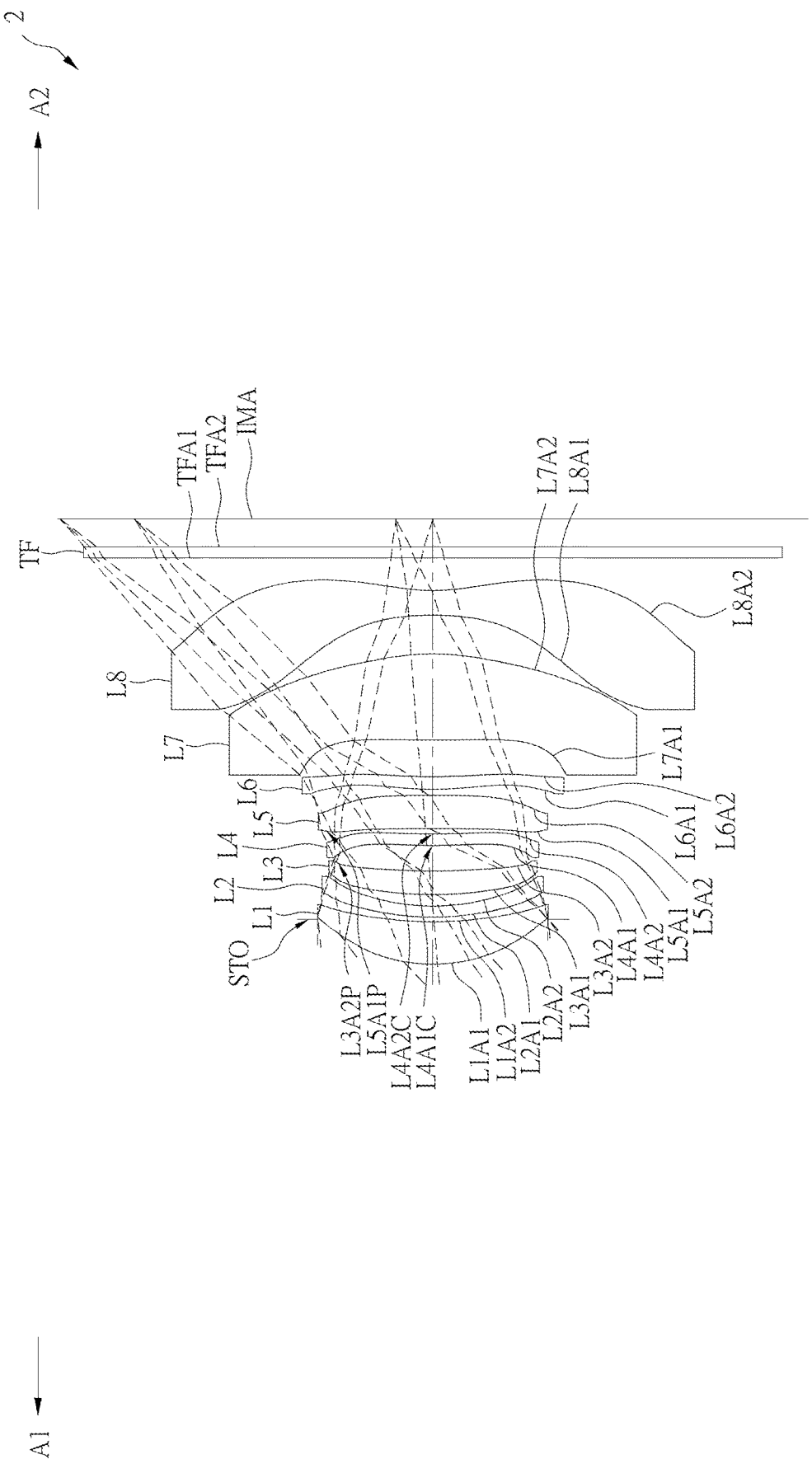
FIG. 10 depicts a cross-sectional view of a second embodiment of an optical imaging lens having eight lens elements according to the present disclosure.

Reference is now made to FIGS. 10-13. FIG. 10 illustrates an example cross-sectional view of an optical imaging lens 2 having eight lens elements of the optical imaging lens according to a second example embodiment. FIGS. 11A-11D show example charts of a longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment.

As shown in FIG. 10, the optical imaging lens 2 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The differences between the second embodiment and the first embodiment may include the radius of curvature, thickness of each lens element, the value of each air gap, aspherical data, related optical parameters, such as back focal length, and the configuration of the concave/convex shape of the object-side surfaces L4A1, L5A1 and the image-side surfaces L3A2, L4A2; but the configuration of the concave/convex shape of surfaces, comprising the object-side surfaces L1A1, L2A1, L3A1, L6A1, L7A1 and L8A1 facing to the object side A1 and the image-side surfaces L1A2, L2A2, L5A2, L6A2, L7A2 and L8A2 facing to the image side A2, and positive or negative configuration of the refracting power of each lens element may be similar to those in the first embodiment. Here and in the embodiments hereinafter, for clearly showing the drawings of the present embodiment, only the surface shapes which are different from that in the first embodiment may be labeled. Specifically, a periphery region L3A2P of the image-side surface L3A2 of the third lens element L3 may be concave, an optical axis region L4A1C of the object-side surface L4A1 of the fourth lens element L4 may be convex, an optical axis region L4A2C of the image-side surface L4A2 of the fourth lens element L4 may be concave, and a periphery region L5A1P of the object-side surface L5A1 of the fifth lens element L5 may be convex. Please refer to FIG. 12 for the optical characteristics of each lens elements in the optical imaging lens 2 of the present embodiment, and please refer to FIG. 42 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of the present embodiment.

Figure 11A:
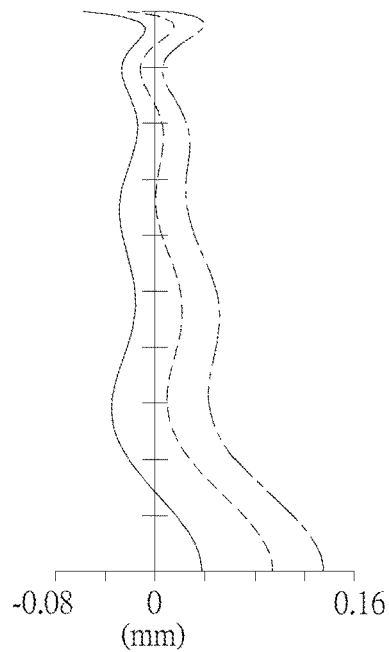
FIGS. 11A-11D depict charts of a longitudinal spherical aberration and other kinds of optical aberrations of a second embodiment of the optical imaging lens according to the present disclosure.
Figure 11B:
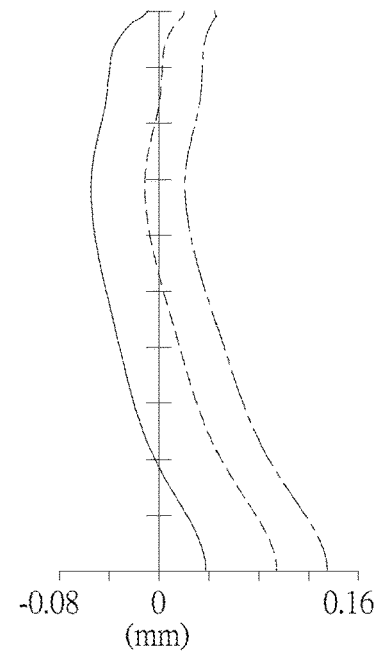
Figure 11C:
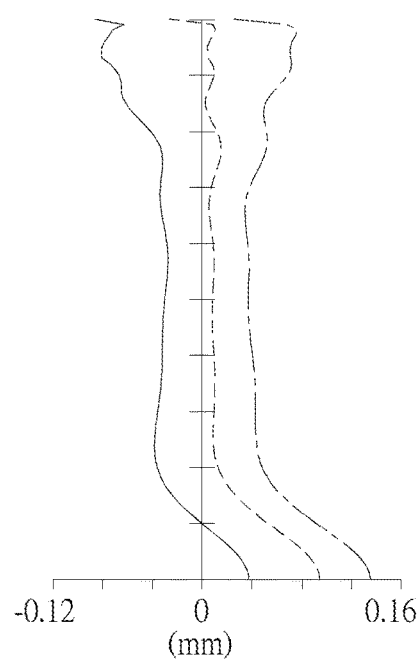
Figure 11D:
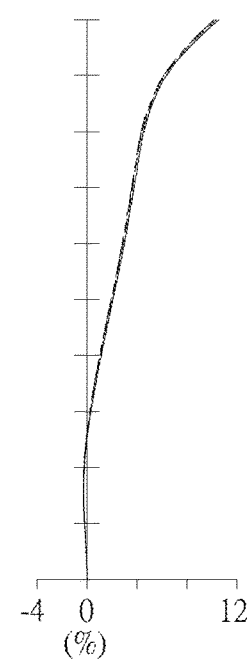

As the longitudinal spherical aberration shown in FIG. 11A, the offset of the off-axis light relative to the image point may be within −0.08~0.16 mm. As the field curvature aberration in the sagittal direction shown in FIG. 11B, the focus variation with regard to the three wavelengths in the whole field may fall within −0.08~0.16 mm. As the field curvature aberration in the tangential direction shown in FIG. 11C, the focus variation with regard to the three wavelengths in the whole field may fall within −0.12~0.16 mm. As shown in FIG. 11D, the variation of the distortion aberration may be within −4~12%. Compared with the first embodiment, the distortion aberration of the present embodiment is smaller.

According to the values of the aberrations, it is shown that the optical imaging lens 2 of the present embodiment, with system length as short as 8.006 mm, Fno as small as 1.649 and image height as great as 6.700 mm, may be capable of providing good imaging quality.

Figure 14:
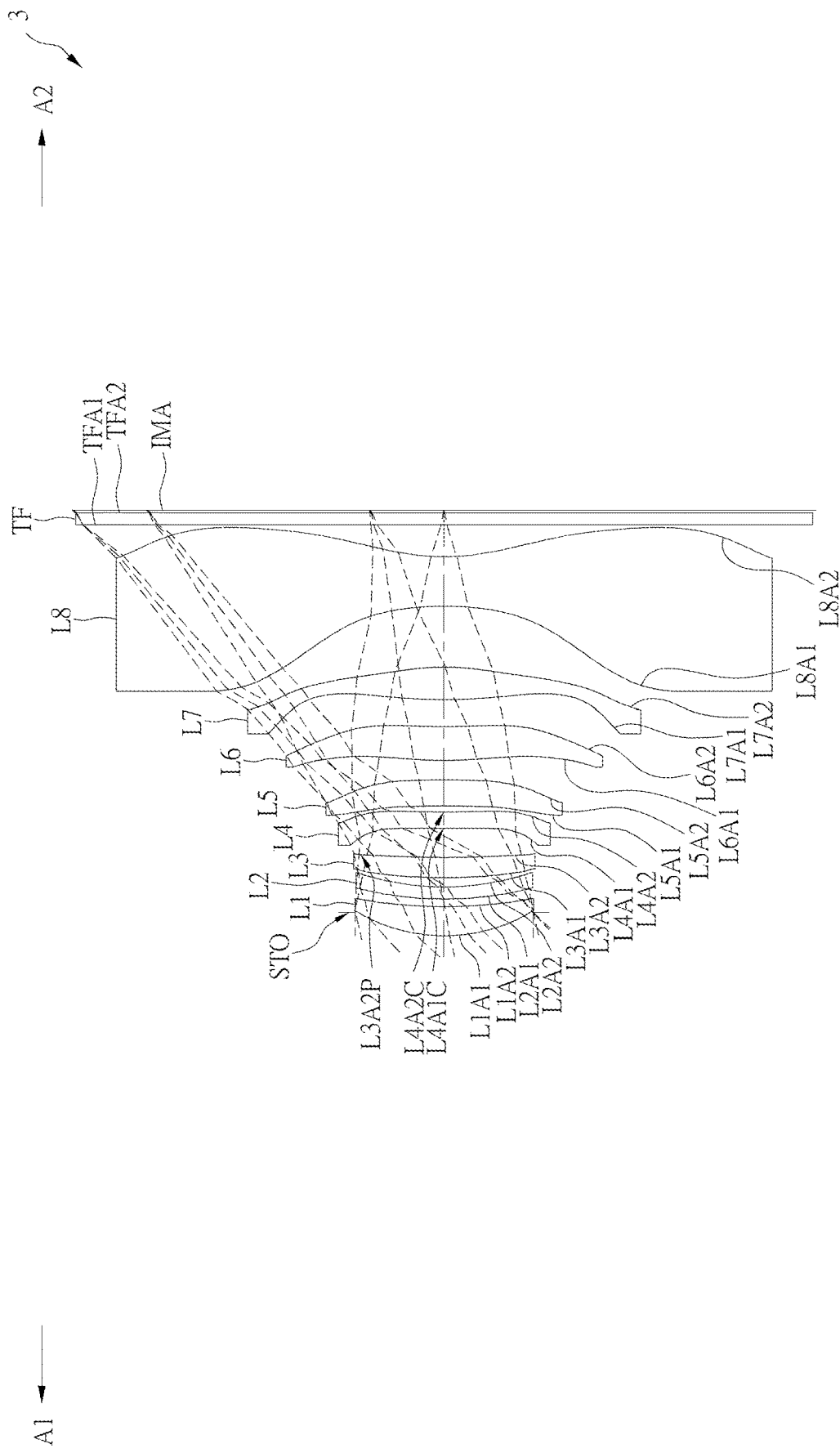
FIG. 14 depicts a cross-sectional view of a third embodiment of an optical imaging lens having eight lens elements according to the present disclosure.

Reference is now made to FIGS. 14-17. FIG. 14 illustrates an example cross-sectional view of an optical imaging lens 3 having eight lens elements of the optical imaging lens according to a third example embodiment. FIGS. 15A-15D show example charts of a longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment.

As shown in FIG. 14, the optical imaging lens 3 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The differences between the third embodiment and the first embodiment may include the radius of curvature and thickness of each lens element, the value of each air gap, aspherical data, related optical parameters, such as back focal length, the configuration of the object-side surface L4A1 and the image-side surfaces L3A2, L4A2, the negative refracting power of the fourth lens element L4; but the configuration of the concave/convex shape of surfaces, comprising the object-side surfaces L1A1, L2A1, L3A1, L5A1, L6A1, L7A1 and L8A1 facing to the object side A1 and the image-side surfaces L1A2, L2A2, L5A2, L6A2, L7A2 and L8A2 facing to the image side A2, and positive or negative configuration of the refracting power of each lens element other than the fourth lens element L4 may be similar to those in the first embodiment. Specifically, a periphery region L3A2P of the image-side surface L3A2 of the third lens element L3 may be concave, an optical axis region L4A1C of the object-side surface L4A1 of the fourth lens element L4 may be convex, and an optical axis region L4A2C of the image-side surface L4A2 of the fourth lens element L4 may be concave. Please refer to FIG. 16 for the optical characteristics of each lens elements in the optical imaging lens 3 of the present embodiment, and please refer to FIG. 42 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of the present embodiment.

Figure 15A:
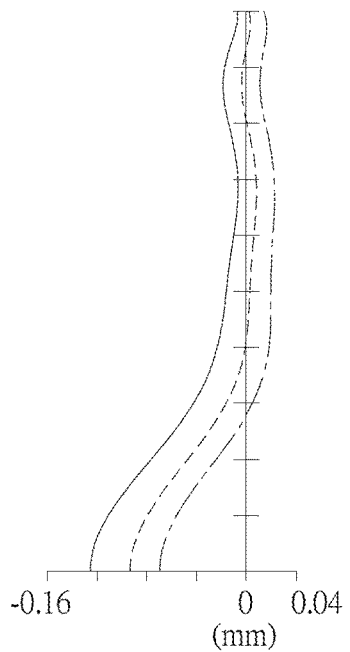
FIGS. 15A-15D depict charts of a longitudinal spherical aberration and other kinds of optical aberrations of a third embodiment of the optical imaging lens according to the present disclosure.
Figure 15B:
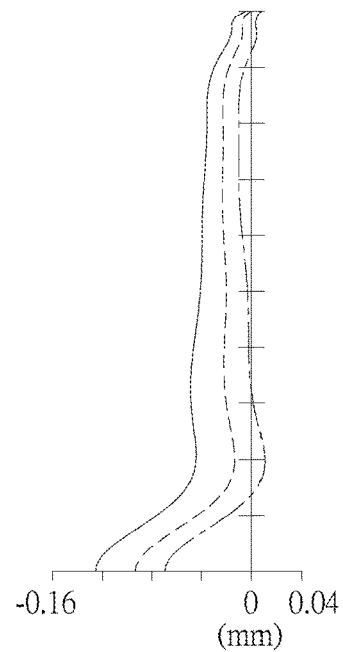
Figure 15C:
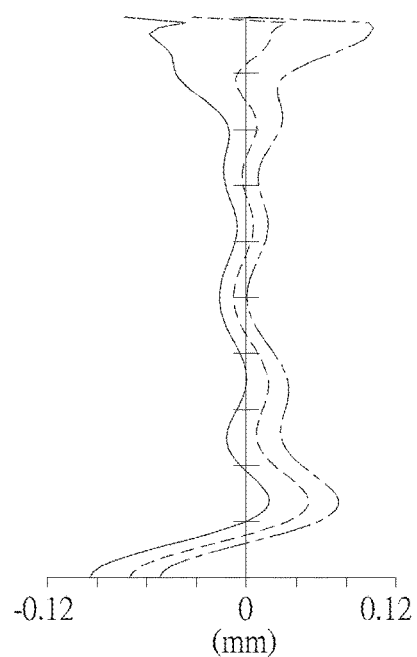
Figure 15D:
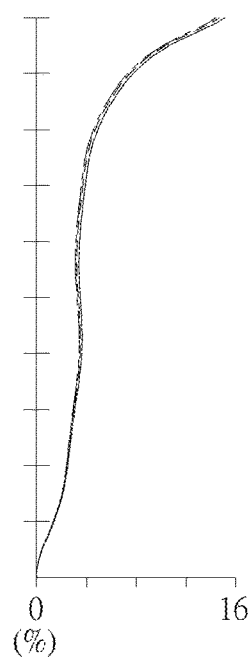

As the longitudinal spherical aberration shown in FIG. 15A, the offset of the off-axis light relative to the image point may be within −0.16~0.04 mm. As the field curvature aberration in the sagittal direction shown in FIG. 15B, the focus variation with regard to the three wavelengths in the whole field may fall within −0.16~0.04 mm. As the field curvature aberration in the tangential direction shown in FIG. 15C, the focus variation with regard to the three wavelengths in the whole field may fall within −0.12~0.12 mm. As shown in FIG. 15D, the variation of the distortion aberration may be within 0~16%. Compared with the first embodiment, the distortion aberration may be smaller in the present embodiment.

According to the values of the aberrations, it is shown that the optical imaging lens 3 of the present embodiment, with system length as short as 7.701 mm, Fno as small as 1.649 and image height as great as 6.700 mm, may be capable of providing good imaging quality.

Figure 18:
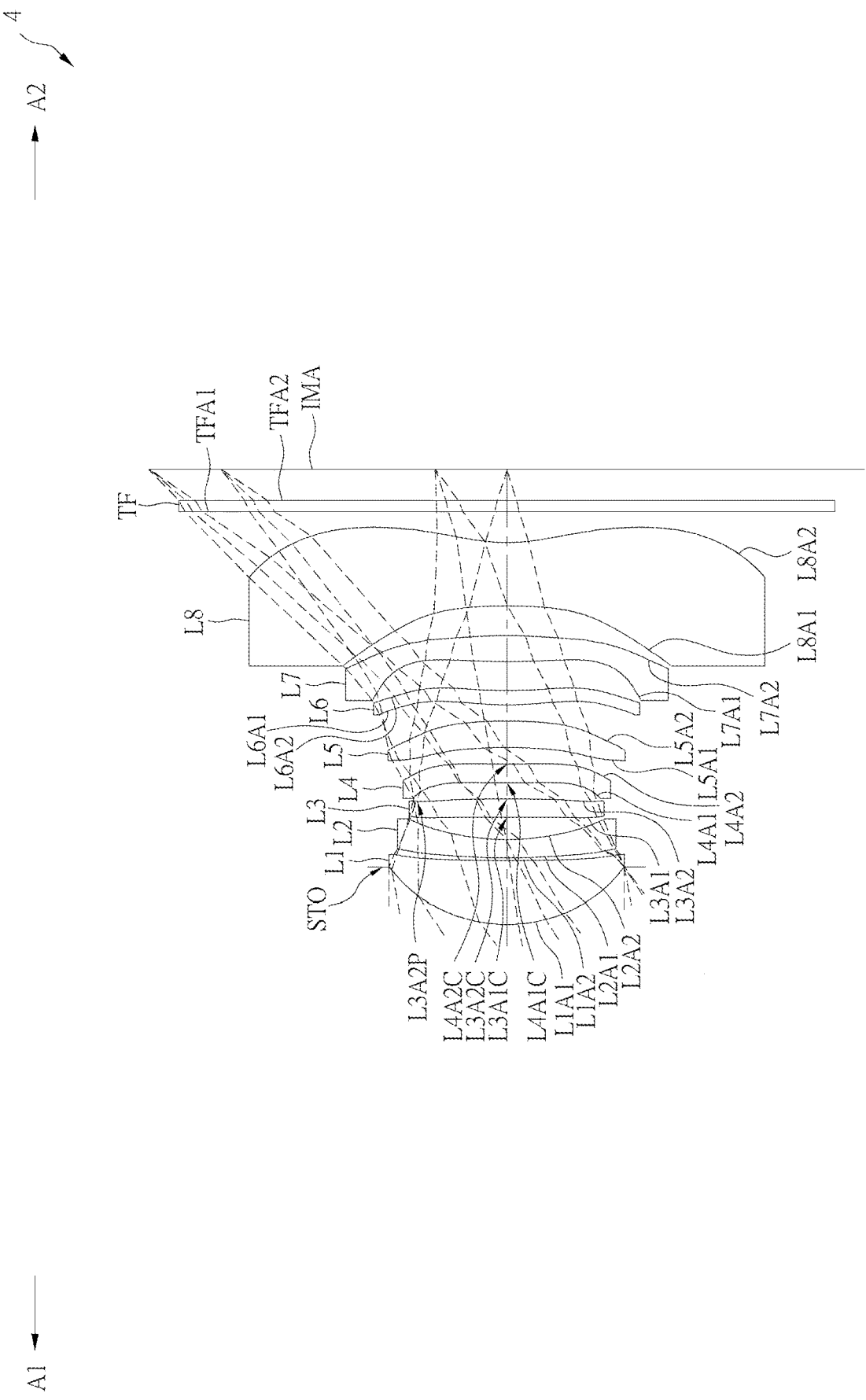
FIG. 18 depicts a cross-sectional view of a fourth embodiment of an optical imaging lens having eight lens elements according to the present disclosure.

Reference is now made to FIGS. 18-21. FIG. 18 illustrates an example cross-sectional view of an optical imaging lens 4 having eight lens elements of the optical imaging lens according to a fourth example embodiment. FIGS. 19A-19D show example charts of a longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment.

As shown in FIG. 18, the optical imaging lens 4 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The differences between the fourth embodiment and the first embodiment may include the radius of curvature and thickness of each lens element, the value of each air gap, aspherical data and related optical parameters, such as back focal length, and the configuration of the concave/convex shape of the object-side surfaces L3A1, L4A1 and the image-side surfaces L3A2, L4A2; but the configuration of the concave/convex shape of surfaces, comprising the object-side surfaces L1A1, L2A1, L5A1, L6A1, L7A1 and L8A1 facing to the object side A1 and the image-side surfaces L1A2, L2A2, L5A2, L6A2, L7A2 and L8A2 facing to the image side A2, and positive or negative configuration of the refracting power of each lens element may be similar to those in the first embodiment. Specifically, an optical axis region L3A1C of the object-side surface L3A1 of the third lens element L3 may be concave, an optical axis region L3A2C of the image-side surface L3A2 of the third lens element L3 may be convex, a periphery region L3A2P of the image-side surface L3A2 of the third lens element L3 may be concave, an optical axis region L4A1C of the object-side surface L4A1 of the fourth lens element L4 may be convex, an optical axis region L4A2C of the image-side surface L4A2 of the fourth lens element L4 may be concave. Please refer to FIG. 20 for the optical characteristics of each lens elements in the optical imaging lens 4 of the present embodiment, please refer to FIG. 42 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of the present embodiment.

Figure 19A:
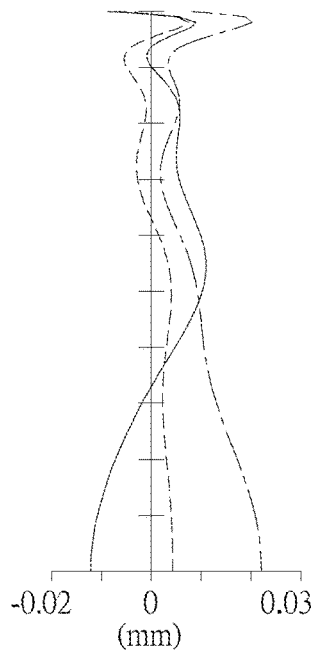
FIGS. 19A-19D depict charts of a longitudinal spherical aberration and other kinds of optical aberrations of a fourth embodiment of the optical imaging lens according to the present disclosure.
Figure 19B:
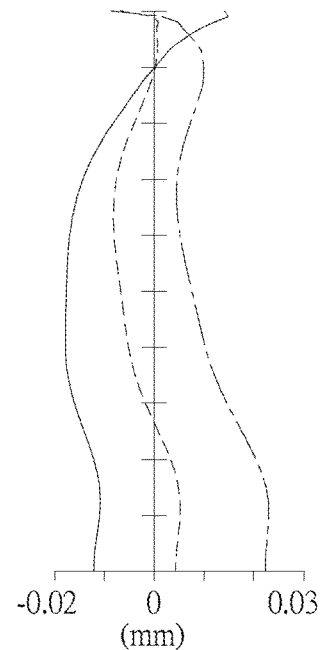
Figure 19C:
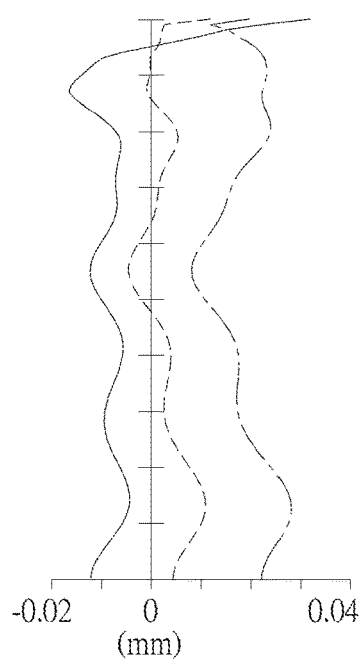
Figure 19D:
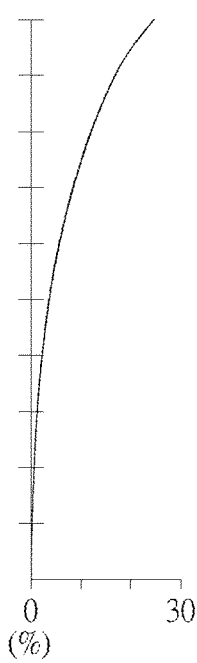

As the longitudinal spherical aberration shown in FIG. 19A, the offset of the off-axis light relative to the image point may be within −0.02~0.03 mm. As the field curvature aberration in the sagittal direction shown in FIG. 19B, the focus variation with regard to the three wavelengths in the whole field may fall within −0.02~0.03 mm. As the field curvature aberration in the tangential direction shown in FIG. 19C, the focus variation with regard to the three wavelengths in the whole field may fall within −0.02~0.04 mm. As shown in FIG. 19D, the variation of the distortion aberration may be within 0~30%. Compared with the first embodiment, the longitudinal spherical aberration, the field curvature aberration in both the sagittal and tangential directions and the distortion aberration may be smaller in the present embodiment.

According to the values of the aberrations, it is shown that the optical imaging lens 4 of the present embodiment, with system length as short as 8.541 mm, Fno as small as 1.649 and image height as great as 6.700 mm, may be capable of providing good imaging quality.

Figure 22:
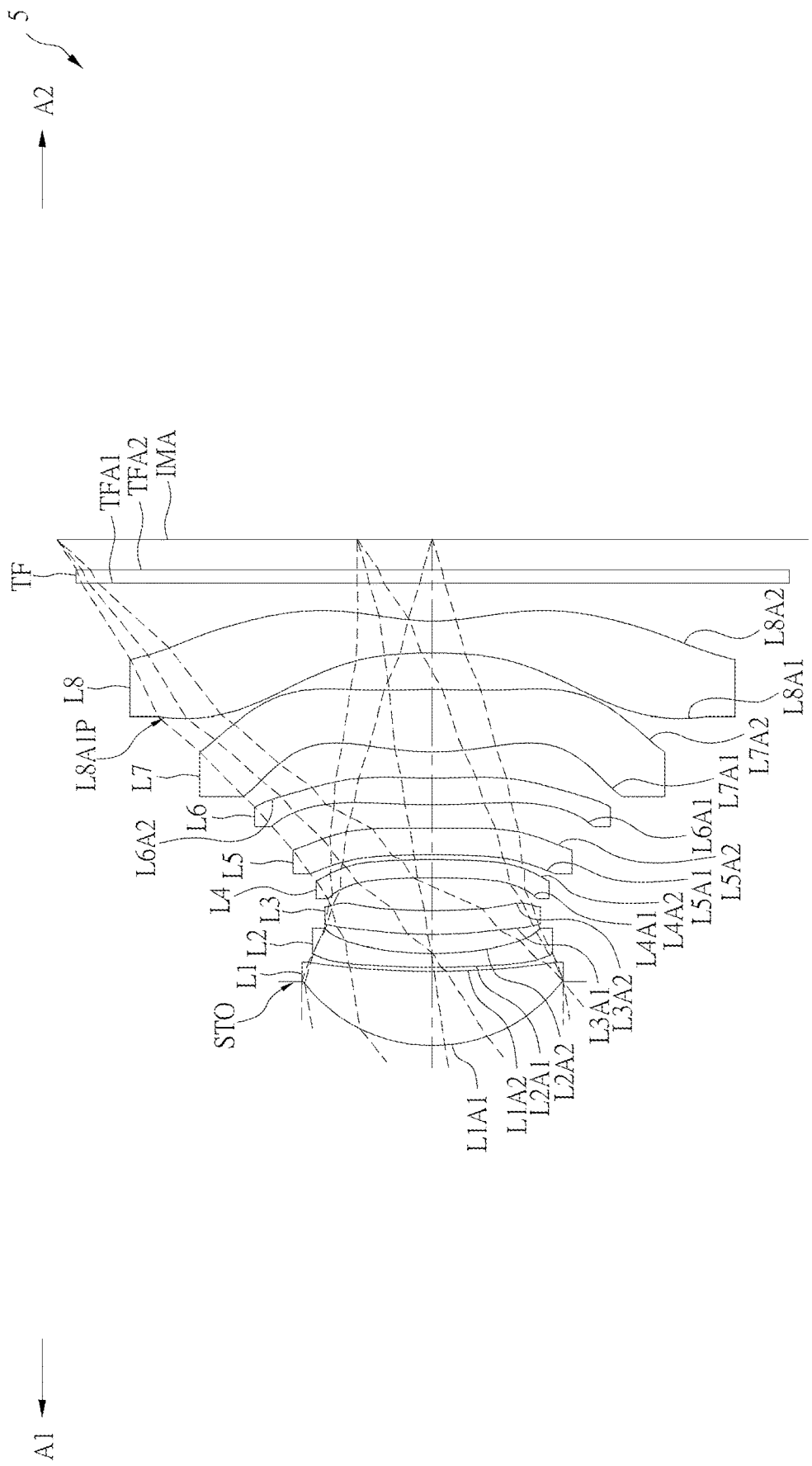
FIG. 22 depicts a cross-sectional view of a fifth embodiment of an optical imaging lens having eight lens elements according to the present disclosure.

Reference is now made to FIGS. 22-25. FIG. 22 illustrates an example cross-sectional view of an optical imaging lens 5 having eight lens elements of the optical imaging lens according to a fifth example embodiment. FIGS. 23A-23D show example charts of a longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment.

As shown in FIG. 22, the optical imaging lens 5 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The differences between the fifth embodiment and the first embodiment may include the radius of curvature and thickness of each lens element, the value of each air gap, aspherical data, related optical parameters, such as back focal length, and the configuration of the object-side surface L8A1; but the configuration of the concave/convex shape of surfaces, comprising the object-side surfaces L1A1, L2A1, L3A1, L4A1, L5A1, L6A1 and L7A1 facing to the object side A1 and the image-side surfaces L1A2, L2A2, L3A2, L4A2, L5A2, L6A2, L7A2 and L8A2 facing to the image side A2, and positive or negative configuration of the refracting power of each lens element may be similar to those in the first embodiment. Specifically, a periphery region L8A1P of the object-side surface L8A1 of the eighth lens element L8 may be convex. Please refer to FIG. 24 for the optical characteristics of each lens elements in the optical imaging lens 5 of the present embodiment, please refer to FIG. 42 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of the present embodiment.

Figure 23A:
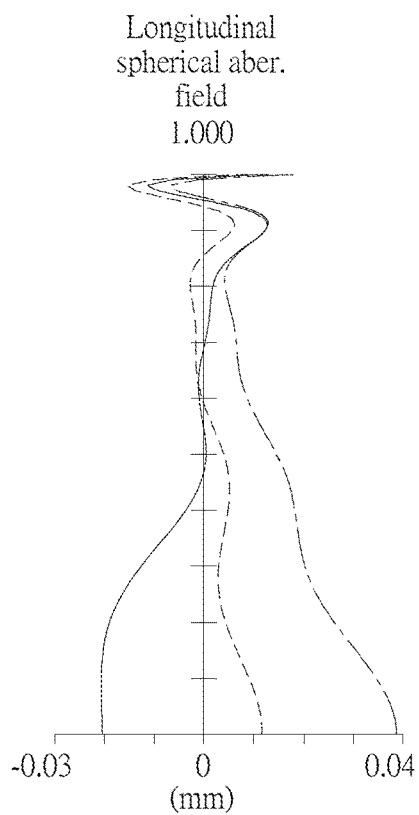
FIGS. 23A-23D depict charts of a longitudinal spherical aberration and other kinds of optical aberrations of a fifth embodiment of the optical imaging lens according to the present disclosure.
Figure 23B:
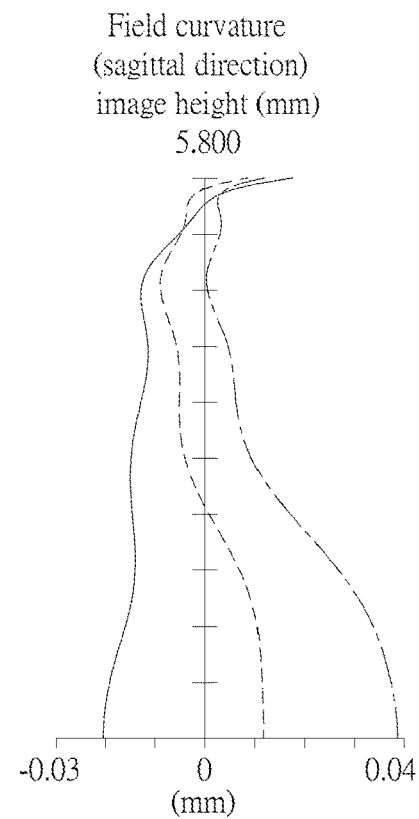
Figure 23C:
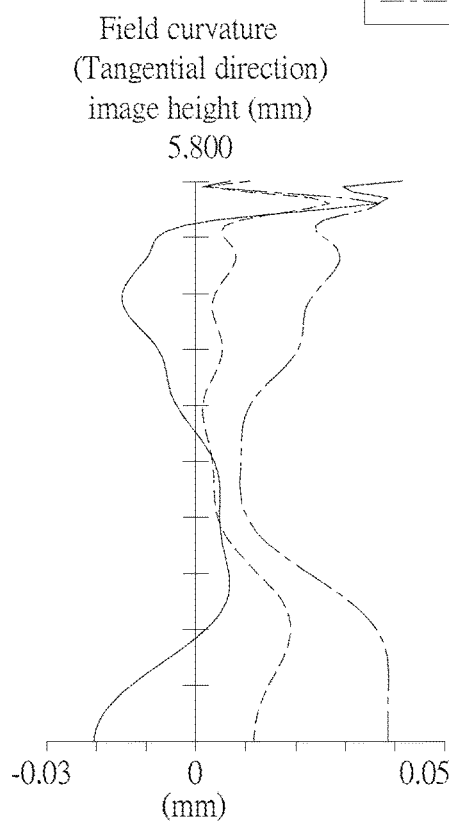
Figure 23D:
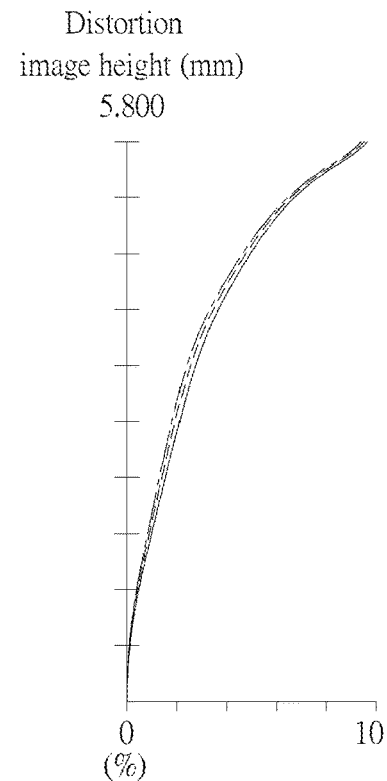

As the longitudinal spherical aberration shown in FIG. 23A, the offset of the off-axis light relative to the image point may be within −0.03~0.04 mm. As the field curvature aberration in the sagittal direction shown in FIG. 23B, the focus variation with regard to the three wavelengths in the whole field may fall within −0.03~0.04 mm. As the field curvature aberration in the tangential direction shown in FIG. 23C, the focus variation with regard to the three wavelengths in the whole field may fall within −0.03~0.05 mm. As shown in FIG. 23D, the variation of the distortion aberration may be within 0~10%. Compared with the first embodiment, the longitudinal spherical aberration, the field curvature aberration in both the sagittal and tangential directions and the distortion aberration may be smaller in the present embodiment.

According to the values of the aberrations, it is shown that the optical imaging lens 5 of the present embodiment, with system length as short as 7.818 mm, Fno as small as 1.649 and image height as great as 5.800 mm, may be capable of providing good imaging quality.

Figure 26:
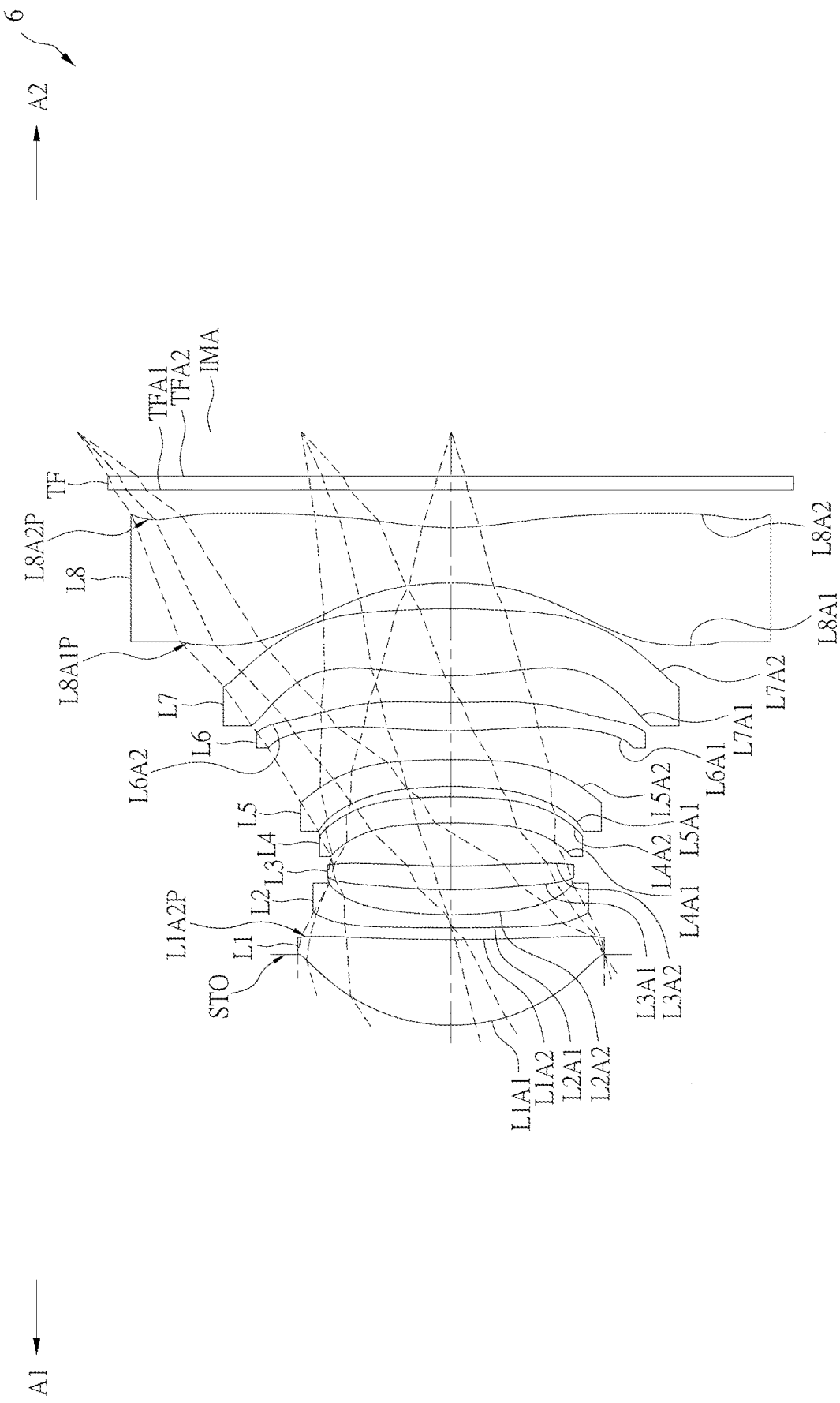
FIG. 26 depicts a cross-sectional view of a sixth embodiment of an optical imaging lens having eight lens elements according to the present disclosure.

Reference is now made to FIGS. 26-29. FIG. 26 illustrates an example cross-sectional view of an optical imaging lens 6 having eight lens elements of the optical imaging lens according to a sixth example embodiment. FIGS. 27A-27D show example charts of a longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment.

As shown in FIG. 26, the optical imaging lens 6 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The differences between the sixth embodiment and the first embodiment may include the radius of curvature and thickness of each lens element, the value of each air gap, aspherical data and related optical parameters, such as back focal length, and the configuration of the concave/convex shape of the object-side surface L8A1 and the image-side surfaces L1A2, L8A2; but the configuration of the concave/convex shape of surfaces, comprising the object-side surfaces L1A1, L2A1, L3A1, L4A1, L5A1, L6A1 and L7A1 facing to the object side A1 and the image-side surfaces L2A2, L3A2, L4A2, L5A2, L6A2 and L7A2 facing to the image side A2, and positive or negative configuration of the refracting power of each lens element may be similar to those in the first embodiment. Specifically, a periphery region L1A2P of the image-side surface L1A2 of the first lens element L1 may be convex, a periphery region L8A1P of the object-side surface L8A1 of the eight lens element L8 may be convex, and a periphery region L8A2P of the image-side surface L8A2 of the eight lens element L8 may be concave. Please refer to FIG. 28 for the optical characteristics of each lens elements in the optical imaging lens 6 of the present embodiment, please refer to FIG. 43 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of the present embodiment.

Figure 27A:
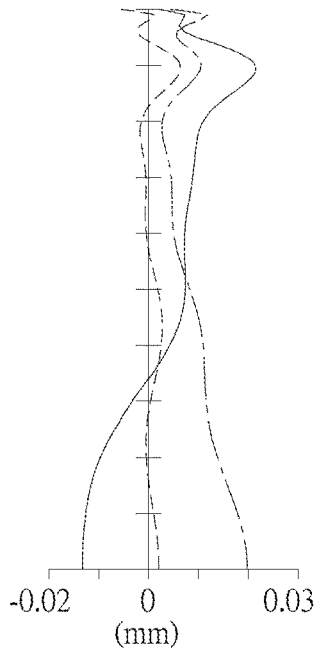
FIGS. 27A-27D depict charts of a longitudinal spherical aberration and other kinds of optical aberrations of a sixth embodiment of the optical imaging lens according the present disclosure.
Figure 27B:
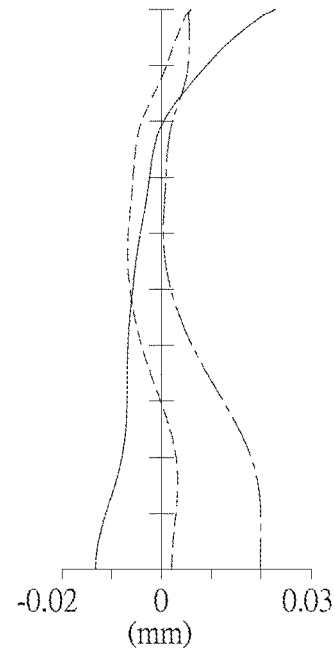
Figure 27C:
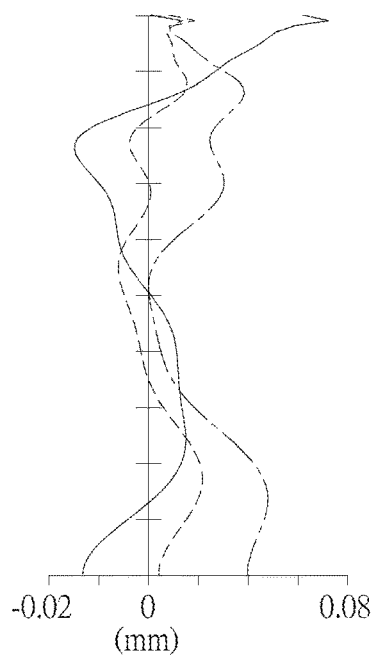
Figure 27D:
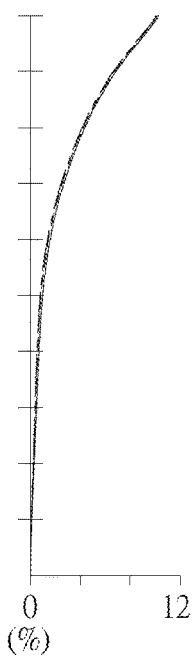

As the longitudinal spherical aberration shown in FIG. 27A, the offset of the off-axis light relative to the image point may be within −0.02~0.03 mm. As the field curvature aberration in the sagittal direction shown in FIG. 27B, the focus variation with regard to the three wavelengths in the whole field may fall within −0.02~0.03 mm. As the field curvature aberration in the tangential direction shown in FIG. 27C, the focus variation with regard to the three wavelengths in the whole field may fall within −0.02~0.08 mm. As shown in FIG. 27D, the variation of the distortion aberration may be within 0~12%. Compared with the first embodiment, the longitudinal spherical aberration, the field curvature aberration in both the sagittal and tangential directions and the distortion aberration may be smaller in the present embodiment.

According to the values of the aberrations, it is shown that the optical imaging lens 6 of the present embodiment, with system length as short as 9.204 mm, Fno as small as 1.649 and image height as great as 5.800 mm, may be capable of providing good imaging quality.

Figure 30:
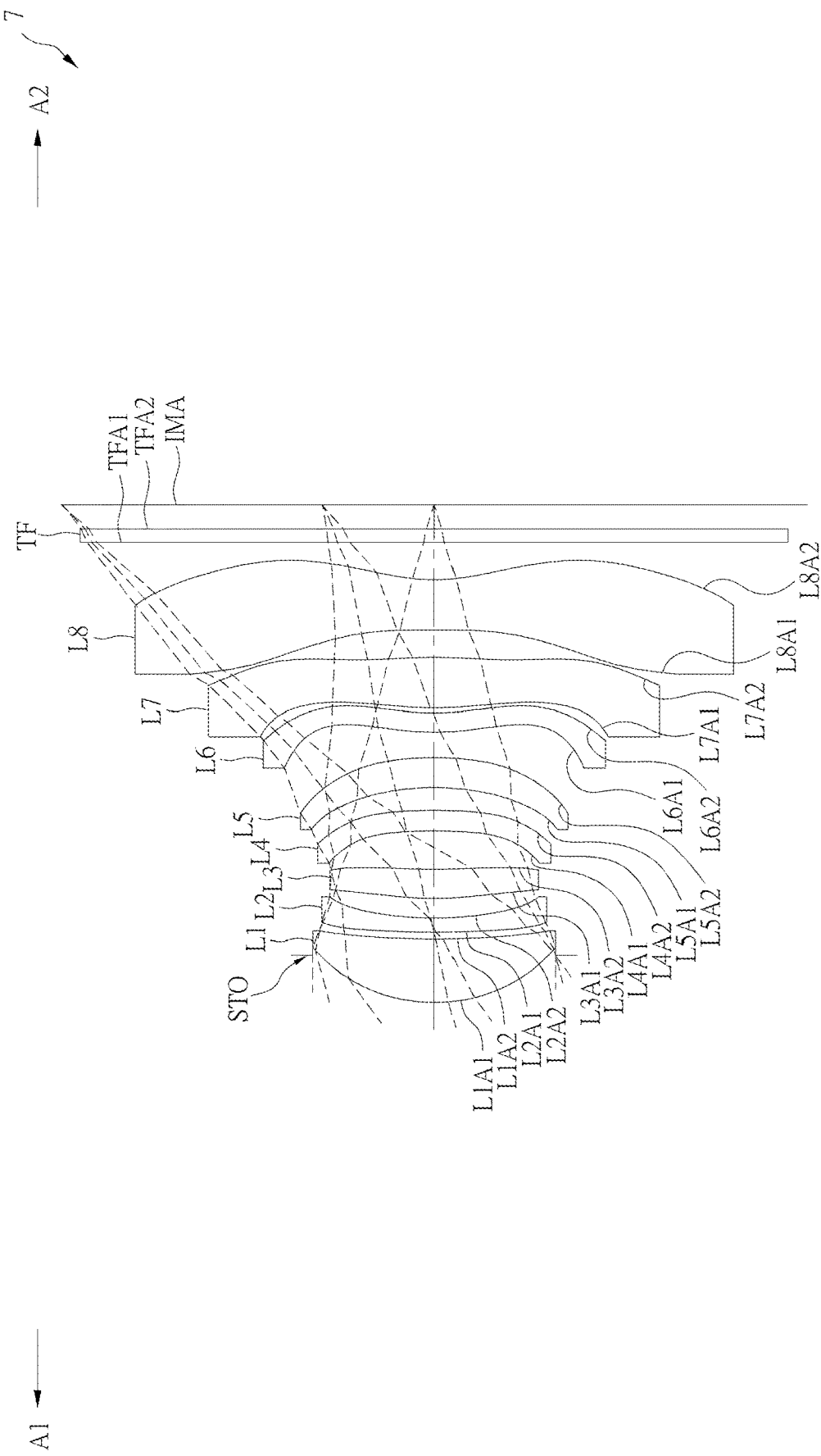
FIG. 30 depicts a cross-sectional view of a seventh embodiment of an optical imaging lens having eight lens elements according to the present disclosure.

Reference is now made to FIGS. 30-33. FIG. 30 illustrates an example cross-sectional view of an optical imaging lens 7 having eight lens elements of the optical imaging lens according to a seventh example embodiment. FIGS. 31A-31D show example charts of a longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment.

As shown in FIG. 30, the optical imaging lens 7 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The differences between the seventh embodiment and the first embodiment may include the radius of curvature and thickness of each lens element, the value of each air gap, and aspherical data, related optical parameters, such as back focal length; but the configuration of the concave/convex shape of surfaces, comprising the object-side surfaces L1A1, L2A1, L3A1, L4A1, L5A1, L6A1, L7A1 and L8A1 facing to the object side A1 and the image-side surfaces L1A2, L2A2, L3A2, L4A2, L5A2, L6A2, L7A2 and L8A2 facing to the image side A2, and positive or negative configuration of the refracting power of each lens element may be similar to those in the first embodiment. Please refer to FIG. 32 for the optical characteristics of each lens elements in the optical imaging lens 7 of the present embodiment, please refer to FIG. 43 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of the present embodiment.

Figure 31A:
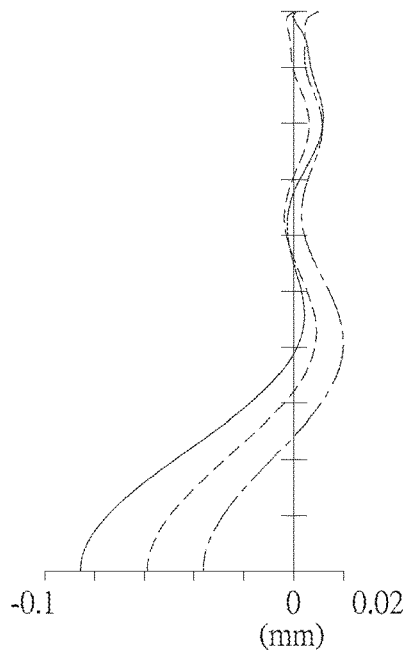
FIGS. 31A-31D depict charts of a longitudinal spherical aberration and other kinds of optical aberrations of a seventh embodiment of the optical imaging lens according to the present disclosure.
Figure 31B:
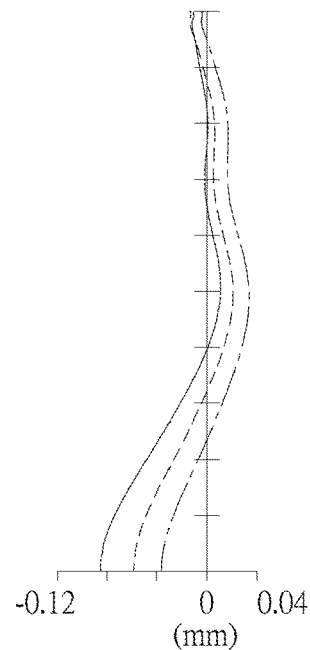
Figure 31C:
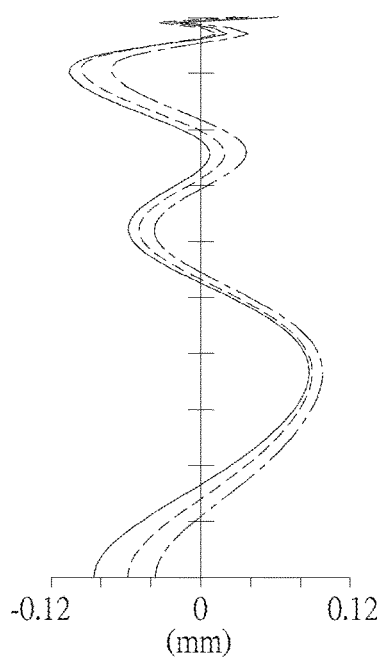
Figure 31D:
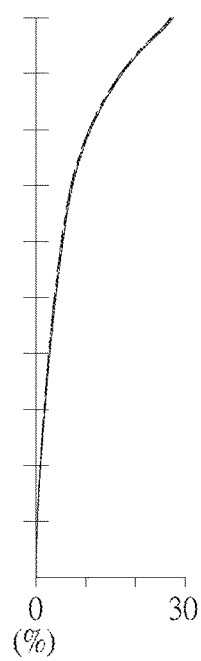

As the longitudinal spherical aberration shown in FIG. 31A, the offset of the off-axis light relative to the image point may be within −0.1~0.02 mm. As the field curvature aberration in the sagittal direction shown in FIG. 31B, the focus variation with regard to the three wavelengths in the whole field may fall within −0.12~0.04 mm. As the field curvature aberration in the tangential direction shown in FIG. 31C, the focus variation with regard to the three wavelengths in the whole field may fall within −0.12~0.12 mm. As shown in FIG. 31D, the variation of the distortion aberration may be within 0~30%. Compared with the first embodiment, the distortion aberration may be smaller in the present embodiment.

According to the values of the aberrations, it is shown that the optical imaging lens 7 of the present embodiment, with system length as short as 7.760 mm, Fno as small as 1.649 and image height as great as 5.800 mm, may be capable of providing good imaging quality.

Figure 34:
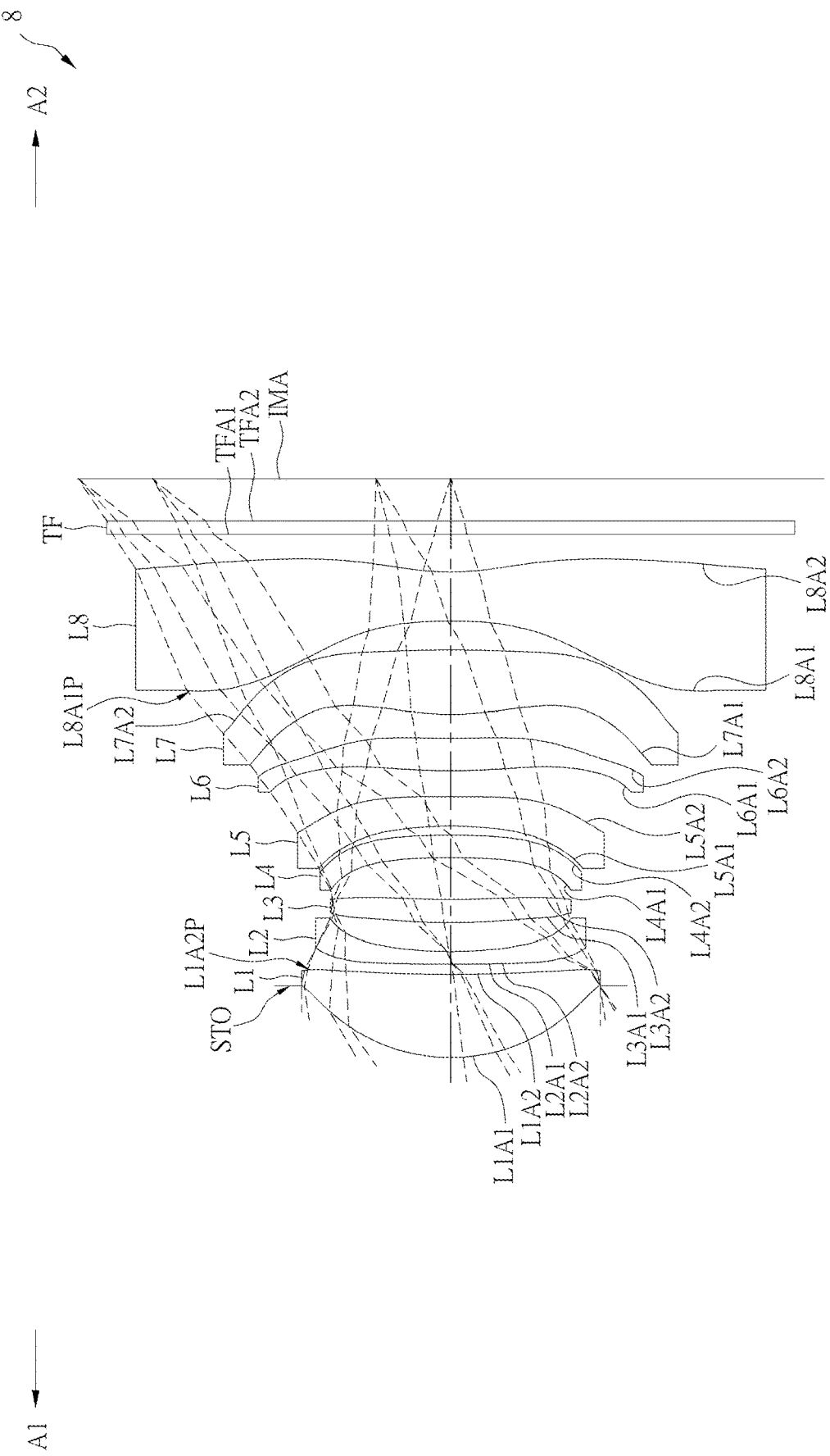
FIG. 34 depicts a cross-sectional view of an eighth embodiment of an optical imaging lens having eight lens elements according to the present disclosure.

Reference is now made to FIGS. 34-37. FIG. 34 illustrates an example cross-sectional view of an optical imaging lens 8 having eight lens elements of the optical imaging lens according to an eighth example embodiment. FIGS. 35A-35D show example charts of a longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment.

As shown in FIG. 34, the optical imaging lens 8 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The differences between the eighth embodiment and the first embodiment may include the radius of curvature and thickness of each lens element, the value of each air gap, aspherical data, related optical parameters, such as back focal length, and the configuration of the concave/convex shape of the object-side surface L8A1 and the image-side surface L1A2; but the configuration of the concave/convex shape of surfaces comprising the object-side surfaces L1A1, L2A1, L3A1, L4A1, L5A1, L6A1 and L7A1 facing to the object side A1 and the image-side surfaces L2A2, L3A2, L4A2, L5A2, L6A2, L7A2 and L8A2 facing to the image side A2, and positive or negative configuration of the refracting power of each lens element may be similar to those in the first embodiment. Specifically, a periphery region L1A2P of the image-side surface L1A2 of the first lens element L1 may be convex, and a periphery region L8A1P of the object-side surface L8A1 of the eighth lens element L8 may be convex. Please refer to FIG. 36 for the optical characteristics of each lens elements in the optical imaging lens 8 of the present embodiment, and please refer to FIG. 43 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of the present embodiment.

Figure 35A:
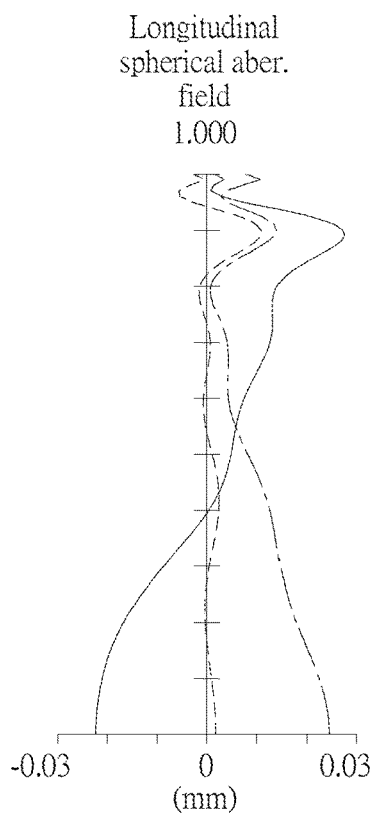
FIGS. 35A-35D depict charts of a longitudinal spherical aberration and other kinds of optical aberrations of an eighth embodiment of the optical imaging lens according to the present disclosure.
Figure 35B:
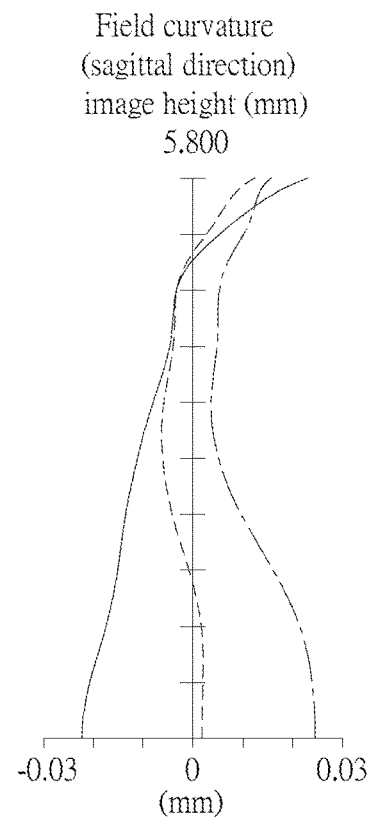
Figure 35C:
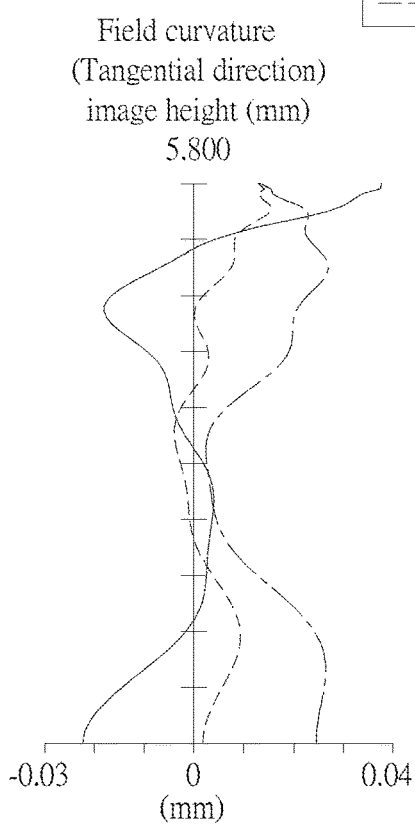
Figure 35D:
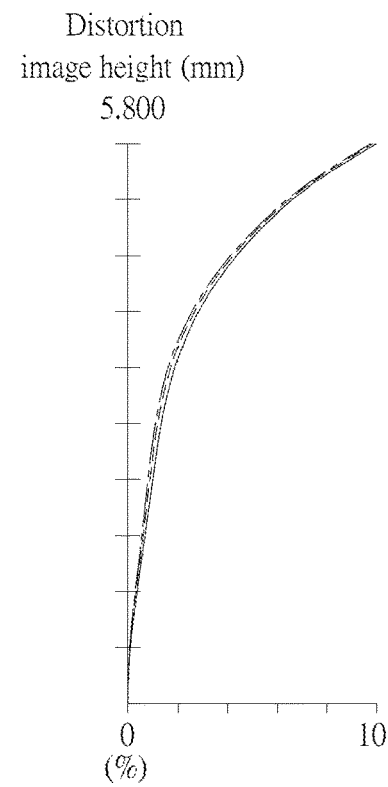

As the longitudinal spherical aberration shown in FIG. 35A, the offset of the off-axis light relative to the image point may be within −0.03~0.03 mm. As the field curvature aberration in the sagittal direction shown in FIG. 35B, the focus variation with regard to the three wavelengths in the whole field may fall within −0.03~0.03 mm. As the field curvature aberration in the tangential direction shown in FIG. 35C, the focus variation with regard to the three wavelengths in the whole field may fall within −0.03~0.04 mm. As shown in FIG. 35D, the variation of the distortion aberration may be within 0~10%. Compared with the first embodiment, the longitudinal spherical aberration, the field curvature aberration in both the sagittal and tangential directions and the distortion aberration may be smaller in the present embodiment.

According to the values of the aberrations, it is shown that the optical imaging lens 8 of the present embodiment, with system length as short as 9.014 mm, Fno as small as 1.649 and image height as great as 5.800 mm, may be capable of providing good imaging quality.

Figure 38:
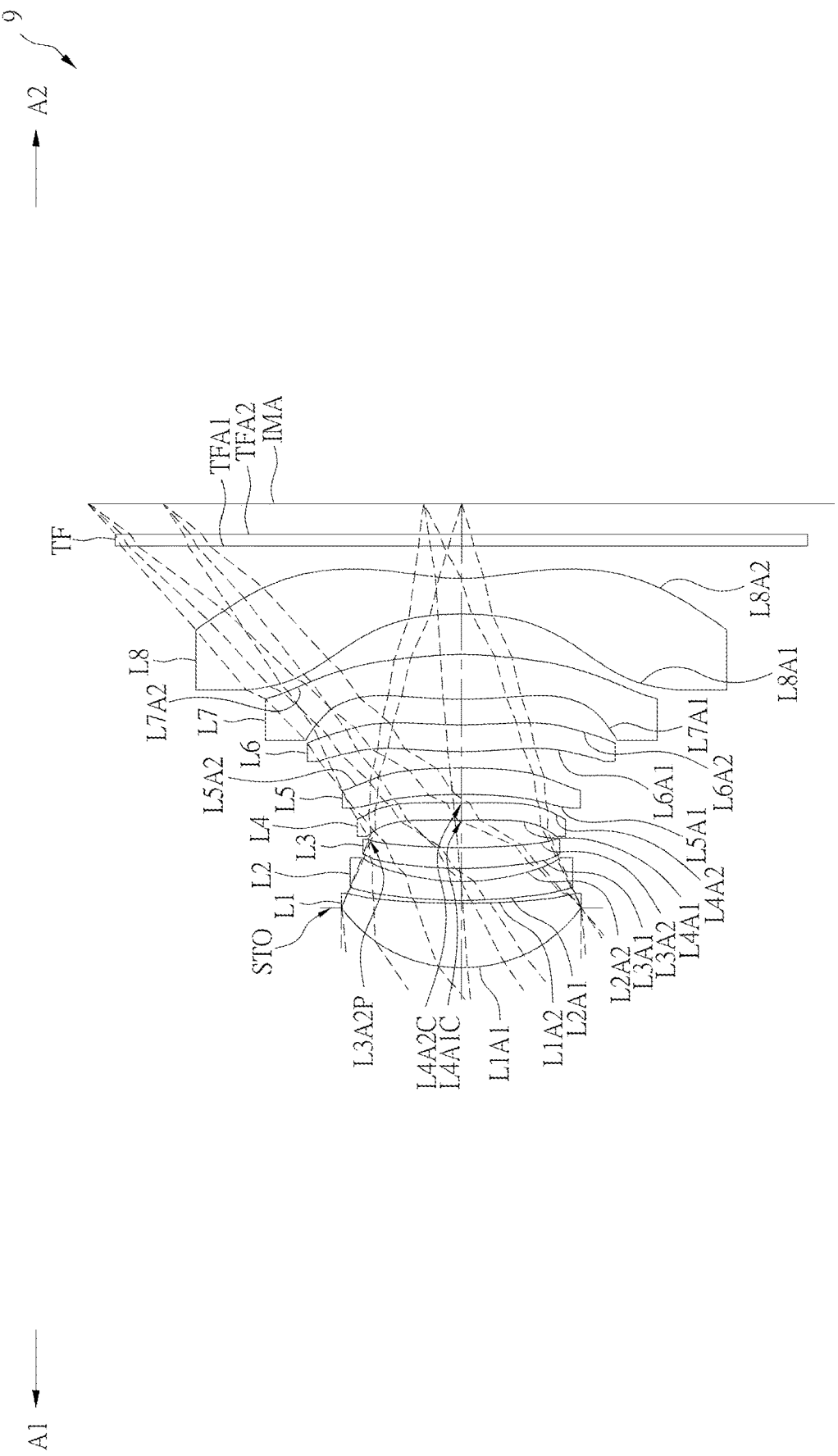
FIG. 38 depicts a cross-sectional view of a ninth embodiment of an optical imaging lens having eight lens elements according to the present disclosure.

Reference is now made to FIGS. 38-41. FIG. 38 illustrates an example cross-sectional view of an optical imaging lens 9 having eight lens elements of the optical imaging lens according to a ninth example embodiment. FIGS. 39A-39D show example charts of a longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment.

As shown in FIG. 38, the optical imaging lens 9 of the present embodiment, in an order from an object side A1 to an image side A2 along an optical axis, may comprise an aperture stop STO, a first lens element L1, a second lens element L2, a third lens element L3, a fourth lens element L4, a fifth lens element L5, a sixth lens element L6, a seventh lens element L7 and an eighth lens element L8.

The differences between the ninth embodiment and the first embodiment may include the radius of curvature and thickness of each lens element, the value of each air gap, aspherical data related optical parameters, such as back focal length, and but the configuration of the concave/convex shape of the object-side surface L4A1 and the image-side surfaces L3A2, L4A2; but the configuration of the concave/convex shape of surfaces comprising the object-side surfaces L1A1, L2A1, L3A1, L5A1, L6A1, L7A1 and L8A1 facing to the object side A1 and the image-side surfaces L1A2, L2A2, L5A2, L6A2, L7A2 and L8A2 facing to the image side A2, and positive or negative configuration of the refracting power of each lens element may be similar to those in the first embodiment. Specifically, a periphery region L3A2P of the image-side surface L3A2 of the third lens element L3 may be concave, an optical axis region L4A1C of the object-side surface L4A1 of the fourth lens element L4 may be convex, and an optical axis region L4A2C of the image-side surface L4A2 of the fourth lens element L4 may be concave. Please refer to FIG. 40 for the optical characteristics of each lens elements in the optical imaging lens 9 of the present embodiment, and please refer to FIG. 43 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of the present embodiment.

Figure 39A:
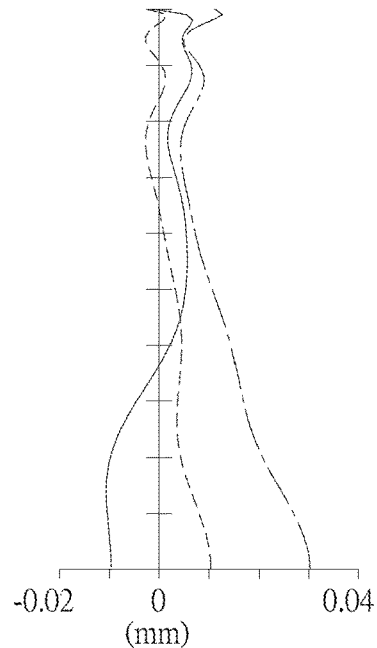
FIGS. 39A-39D depict charts of a longitudinal spherical aberration and other kinds of optical aberrations of a ninth embodiment of the optical imaging lens according to the present disclosure.
Figure 39B:
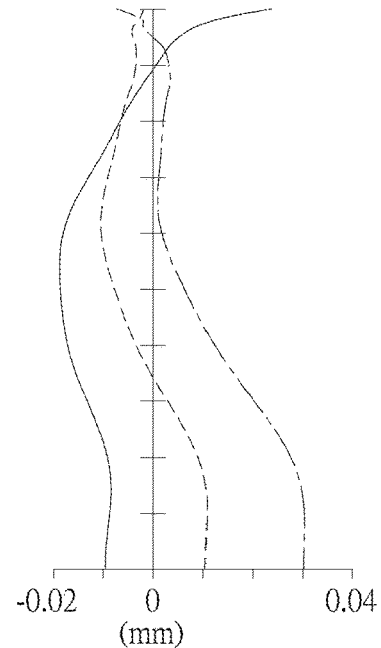
Figure 39C:
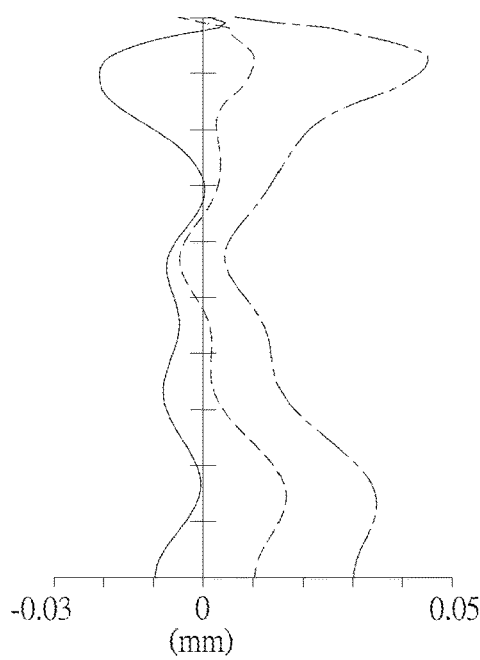
Figure 39D:
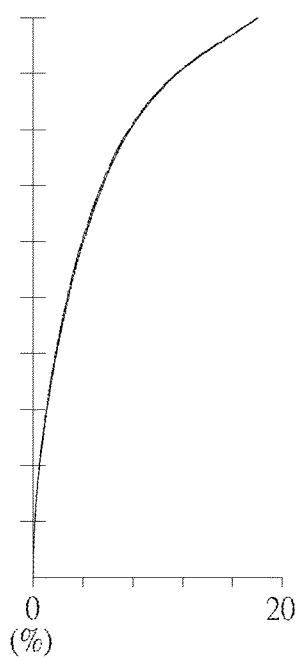

As the longitudinal spherical aberration shown in FIG. 39A, the offset of the off-axis light relative to the image point may be within −0.02~0.04 mm. As the field curvature aberration in the sagittal direction shown in FIG. 39B, the focus variation with regard to the three wavelengths in the whole field may fall within −0.02~0.04 mm. As the field curvature aberration in the tangential direction shown in FIG. 39C, the focus variation with regard to the three wavelengths in the whole field may fall within −0.03~0.05 mm. As shown in FIG. 39D, the variation of the distortion aberration may be within 0~20%. Compared with the first embodiment, the longitudinal spherical aberration, the field curvature aberration in both the sagittal and tangential directions and the distortion aberration may be smaller in the present embodiment.

According to the values of the aberrations, it is shown that the optical imaging lens 9 of the present embodiment, with system length as short as 8.347 mm, Fno as small as 1.649 and image height as great as 6.700 mm, may be capable of providing good imaging quality.

Please refer to FIGS. 42 and 43 for the values of V5+V6+V7, V5+V6, ImgH/(T3+T4), AAG/BFL, TTL/(T2+G45+G67), TL/T1, (T1+T2+T3+T4)/D78, (T5+T8)/G34, ImgH/(T5+G56), EFL/BFL, TTL/T8, (G67+T7+G78)/T1, D25/(T1+G12), ALT/AAG, ImgH/(T2+G45), (EFL+BFL)/(T5+G56), TL/(G12+T4), (G34+T5)/T6, (T4+G67)/G23, (EFL+ImgH)/ALT, (V6+V7)−(V2+V4), (V7+V8)−(V4+V6), |V6−V7|, V6−V2 and V7−V4 of all eleven embodiments, and the optical imaging lens of the present disclosure may satisfy Inequalities (1), (2) and/or at least one of Inequalities (3)~(25).

According to above illustration, the longitudinal spherical aberration, field curvature in both the sagittal direction and tangential direction and distortion aberration in all embodiments may meet the user requirement of a related product in the market. The off-axis light with regard to three different wavelengths (470 nm, 555 nm, 650 nm) may be focused around an image point and the offset of the off-axis light relative to the image point may be well controlled with suppression for the longitudinal spherical aberration, field curvature both in the sagittal direction and tangential direction and distortion aberration. The curves of different wavelengths may be close to each other, and this represents that the focusing for light having different wavelengths may be good to suppress chromatic dispersion. In summary, lens elements are designed and matched for achieving good imaging quality.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a conditional expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a conditional expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a conditional expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditional expressions are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a conditional expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens element having an object-side surface facing toward the object side and allowing imaging rays to pass through and an image-side surface facing toward the image side and allowing the imaging rays to pass through, wherein:

the first lens element has positive refracting power;
the second lens element has negative refracting power;
the third lens element has positive refracting power;
the fifth lens element has negative refracting power, and an optical axis region of the image-side surface of the fifth lens element is convex;
the sixth lens element has positive refracting power;
the seventh lens element has positive refracting power;
the eighth lens element has negative refracting power;
lens elements included by the optical imaging lens are only the eight lens elements described above; and
an abbe number of the fifth lens element is represented by V5, an abbe number of the sixth lens element is represented by V6, an abbe number of the seventh lens element is represented by V7, a sum of seven air gaps from the first lens element to the eighth lens element along the optical axis is represented by AAG, a distance from the image-side surface of the eighth lens element to an image plane along the optical axis is represented by BFL, and the optical imaging lens satisfies the inequalities:

$V5+V6+V7 \geq 155.000$ and $AAG/BFL \geq 1.800$.

2. The optical imaging lens according to claim 1, wherein an image height of the optical imaging lens is represented by ImgH, a thickness of the third lens element along the optical axis is represented by T3, a thickness of the fourth lens element along the optical axis is represented by T4, and ImgH, T3 and T4 satisfy the inequality:

$ImgH/(T3+T4) \geq 7.500$.

3. The optical imaging lens according to claim 1, wherein a distance from the object-side surface of the first lens element to the image plane along the optical axis is represented by TTL, a thickness of the second lens element along the optical axis is represented by T2, a distance from the image-side surface of the fourth lens element to the object-side surface of the fifth lens element along the optical axis is represented by G45, a distance from the image-side surface of the sixth lens element to the object-side surface of the seventh lens element along the optical axis is represented by G67, and TTL, T2, G45 and G67 satisfy the inequality:

$TTL/(T2+G45+G67) \geq 7.200$.

4. The optical imaging lens according to claim 1, wherein a distance from the object-side surface of the first lens element to the image-side surface of the eighth lens element along the optical axis is represented by TL, a thickness of the first lens element along the optical axis is represented by T1, and TL and T1 satisfy the inequality:

$TL/T1 \leq 13.000$.

5. The optical imaging lens according to claim 1, wherein a thickness of the first lens element along the optical axis is represented by T1, a thickness of the second lens element along the optical axis is represented by T2, a thickness of the third lens element along the optical axis is represented by T3, a thickness of the fourth lens element along the optical axis is represented by T4, a distance from the object-side surface of the seventh lens element to the image-side surface of the eighth lens element along the optical axis is represented by D78, and T1, T2, T3, T4 and D78 satisfy the inequality:

$(T1+T2+T3+T4)/D78 \leq 1.000$.

6. The optical imaging lens according to claim 1, wherein a thickness of the fifth lens element along the optical axis is represented by T5, a thickness of the eighth lens element along the optical axis is represented by T8, a distance from the image-side surface of the third lens element to the object-side surface of the fourth lens element along the optical axis is represented by G34, and T5, T8 and G34 satisfy the inequality:

$(T5+T8)/G34 \leq 5.600$.

7. An optical imaging lens, comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens element having an object-side surface facing toward the object side and allowing imaging rays to pass through and an image-side surface facing toward the image side and allowing the imaging rays to pass through, wherein:

the first lens element has positive refracting power;
the second lens element has negative refracting power, and a periphery region of the object-side surface of the second lens element is convex;
the third lens element has positive refracting power;
the fifth lens element has negative refracting power;
the sixth lens element has positive refracting power;
the seventh lens element has positive refracting power;
the eighth lens element has negative refracting power;
an optical axis region of the object-side surface of the seventh lens element is convex;
lens elements included by the optical imaging lens are only the eight lens elements described above; and
an abbe number of the fifth lens element is represented by V5, an abbe number of the sixth lens element is represented by V6, an abbe number of the seventh lens element is represented by V7, an effective focal length of the optical imaging lens is represented by EFL, a distance from the image-side surface of the eighth lens element to an image plane along the optical axis is represented by BFL, and the optical imaging lens satisfies the inequalities:

$V5+V6+V7 \geq 155.000$ and $EFL/BFL \geq 5.300$.

8. The optical imaging lens according to claim 7, wherein an image height of the optical imaging lens is represented by ImgH, a thickness of the fifth lens element along the optical axis is represented by T5, a distance from the image-side surface of the fifth lens element to the object-side surface of the sixth lens element along the optical axis is represented by G56, and ImgH, T5 and G56 satisfy the inequality:

$ImgH/(T5+G56) \geq 6.700$.

9. The optical imaging lens according to claim 7, wherein a distance from the object-side surface of the first lens element to the image plane along the optical axis is represented by TTL, a thickness of the eighth lens element along the optical axis is represented by T8, and TTL and T8 satisfy the inequality:

$TTL/T8 \leq 18.000$.

10. The optical imaging lens according to claim 7, wherein a distance from the image-side surface of the sixth lens element to the object-side surface of the seventh lens element along the optical axis is represented by G67, a thickness of the seventh lens element along the optical axis is represented by T7, a distance from the image-side surface of the seventh lens element to the object-side surface of the eighth lens element along the optical axis is represented by G78, a thickness of the first lens element along the optical axis is represented by T1, and G67, T7, G78 and T1 satisfy the inequality:

$(G67+T7+G78)/T1 \leq 4.100$.

11. The optical imaging lens according to claim 7, wherein a distance from the object-side surface of the second lens element to the image-side surface of the fifth lens element along the optical axis is represented by D25, a thickness of the first lens element along the optical axis is represented by T1, a distance from the image-side surface of the first lens element to the object-side surface of the second lens element along the optical axis is represented by G12, and D25, T1 and G12 satisfy the inequality:

$D25/(T1+G12) \leq 5.000$.

12. The optical imaging lens according to claim 7, wherein a sum of the thicknesses of all eight lens elements from the first lens element to the eighth lens element along the optical axis is represented by ALT, a sum of seven air gaps from the first lens element to the eighth lens element along the optical axis is represented by AAG, and ALT and AAG satisfy the inequality:

$ALT/AAG \leq 1.900$.

13. An optical imaging lens, comprising a first lens element, a second lens element, a third lens element, a fourth lens element, a fifth lens element, a sixth lens element, a seventh lens element and an eighth lens element sequentially from an object side to an image side along an optical axis, each of the first, second, third, fourth, fifth, sixth, seventh and eighth lens element having an object-side surface facing toward the object side and allowing imaging rays to pass through and an image-side surface facing toward the image side and allowing the imaging rays to pass through, wherein:
the first lens element has positive refracting power;
the second lens element has negative refracting power;
the third lens element has positive refracting power;
the fifth lens element has negative refracting power;
the sixth lens element has positive refracting power, and an optical axis region of the image-side surface of the sixth lens element is concave;
the seventh lens element has positive refracting power, and an optical axis region of the object-side surface of the seventh lens element is convex;
the eighth lens element has negative refracting power;
lens elements included by the optical imaging lens are only the eight lens elements described above; and
an abbe number of the fifth lens element is represented by V5, an abbe number of the sixth lens element is represented by V6, a distance from the object-side surface of the first lens element to an image plane along the optical axis is represented by TTL, a thickness of the second lens element along the optical axis is represented by T2, a distance from the image-side surface of the fourth lens element to the object-side surface of the fifth lens element along the optical axis is represented by G45, a distance from the image-side surface of the sixth lens element to the object-side surface of the seventh lens element along the optical axis is represented by G67, and the optical imaging lens satisfies the inequalities:

$V5+V6 \geq 85.000$ and $TTL/(T2+G45+G67) \geq 7.200$.

14. The optical imaging lens according to claim 13, wherein an image height of the optical imaging lens is represented by ImgH, and ImgH, T2 and G45 satisfy the inequality:

$ImgH/(T2+G45) \geq 10.000$.

15. The optical imaging lens according to claim 13, wherein an effective focal length of the optical imaging lens is represented by EFL, a distance from the image-side surface of the eighth lens element to the image plane along the optical axis is represented by BFL, a thickness of the fifth lens element along the optical axis is represented by T5, a distance from the image-side surface of the fifth lens element to the object-side surface of the sixth lens element along the optical axis is represented by G56, and EFL, BFL, T5 and G56 satisfy the inequality:

$(EFL+BFL)/(T5+G56) \leq 11.400$.

16. The optical imaging lens according to claim 13, wherein a distance from the object-side surface of the first lens element to the image-side surface of the eighth lens element along the optical axis is represented by TL, a distance from the image-side surface of the first lens element to the object-side surface of the second lens element along the optical axis is represented by G12, a thickness of the fourth lens element along the optical axis is represented by T4, and TL, G12 and T4 satisfy the inequality:

$TL/(G12+T4) \geq 13.000$.

17. The optical imaging lens according to claim 13, wherein a distance from the image-side surface of the third lens element to the object-side surface of the fourth lens element along the optical axis is represented by G34, a thickness of the fifth lens element along the optical axis is represented by T5, a thickness of the sixth lens element along the optical axis is represented by T6, and G34, T5 and T6 satisfy the inequality:

$(G34+T5)/T6 \geq 1.500$.

18. The optical imaging lens according to claim 13, wherein a thickness of the fourth lens element along the optical axis is represented by T4, a distance from the image-side surface of the second lens element to the object-side surface of the third lens element along the optical axis is represented by G23, and T4, G67 and G23 satisfy the inequality:

$(T4+G67)/G23 \leq 4.500$.

* * * * *